United States Patent
Forgeron et al.

(10) Patent No.: US 9,758,437 B2
(45) Date of Patent: Sep. 12, 2017

(54) APPARATUS FOR DELIVERY OF CARBON DIOXIDE TO A CONCRETE MIX IN A MIXER AND DETERMINING FLOW RATE

(71) Applicant: CarbonCure Technologies Inc., Dartmouth (CA)

(72) Inventors: Dean Paul Forgeron, White's Lake (CA); Joshua Jeremy Brown, Lower Sackville (CA); George Sean Monkman, Montreal (CA); Paul J. Sandberg, Beverly, MA (US)

(73) Assignee: CarbonCure Technologies Inc., Dartmouth, NS (CA)

( * ) Notice: Subject to any disclaimer, the term of this patent is extended or adjusted under 35 U.S.C. 154(b) by 0 days.

(21) Appl. No.: 15/161,927

(22) Filed: May 23, 2016

(65) Prior Publication Data

US 2016/0280610 A1 Sep. 29, 2016

Related U.S. Application Data

(60) Division of application No. 14/642,536, filed on Mar. 9, 2015, now Pat. No. 9,376,345, and a
(Continued)

(51) Int. Cl.
*B28C 7/12* (2006.01)
*C04B 22/06* (2006.01)
(Continued)

(52) U.S. Cl.
CPC .... *C04B 40/0032* (2013.01); *B01F 15/00136* (2013.01); *B01F 15/00142* (2013.01);
(Continued)

(58) Field of Classification Search
CPC B29B 7/60; B29B 7/603; C04B 12/00; C04B 40/0032; C04B 28/02;
(Continued)

(56) References Cited

U.S. PATENT DOCUMENTS

| 128,980 A | 7/1872 | Rowland |
| 170,594 A | 11/1875 | Richardson |

(Continued)

FOREIGN PATENT DOCUMENTS

| AU | 2397377 A | 10/1978 |
| AU | 504446 B2 | 10/1979 |

(Continued)

OTHER PUBLICATIONS

Abanades, et al. Conversion limits in the reaction of CO2 with lime. Energy and Fuels. 2003; 17(2):308-315.
(Continued)

*Primary Examiner* — Charles Cooley
(74) *Attorney, Agent, or Firm* — Wilson Soncini Goodrich & Rosati

(57) ABSTRACT

Compositions and methods are provided for a system in which liquid carbon dioxide, or a mixture of liquid and gaseous carbon dioxide, is converted to solid carbon dioxide by exiting an orifice at a sufficient pressure drop, e.g., for delivery of carbon dioxide to a concrete mixture in a mixer.

28 Claims, 7 Drawing Sheets

Related U.S. Application Data continuation-in-part of application No. PCT/CA2014/050611, filed on Jun. 25, 2014, and a continuation-in-part of application No. 14/249,308, filed on Apr. 9, 2014, now Pat. No. 9,108,883.

(60) Provisional application No. 62/086,024, filed on Dec. 1, 2014, provisional application No. 62/096,018, filed on Dec. 23, 2014, provisional application No. 61/992,089, filed on May 12, 2014, provisional application No. 62/083,784, filed on Nov. 24, 2014, provisional application No. 61/839,312, filed on Jun. 25, 2013, provisional application No. 61/847,254, filed on Jul. 17, 2013, provisional application No. 61/879,049, filed on Sep. 17, 2013, provisional application No. 61/925,100, filed on Jan. 8, 2014, provisional application No. 61/938,063, filed on Feb. 10, 2014, provisional application No. 61/980,505, filed on Apr. 16, 2014.

(51) Int. Cl.

| | | |
|---|---|---|
| *C04B 40/00* | (2006.01) | |
| *G01F 1/00* | (2006.01) | |
| *B01F 15/00* | (2006.01) | |
| *C04B 40/02* | (2006.01) | |
| *B28C 5/46* | (2006.01) | |
| *B28C 5/42* | (2006.01) | |
| *C04B 22/10* | (2006.01) | |
| *G01F 1/86* | (2006.01) | |

(52) U.S. Cl.
CPC .. *B01F 15/00162* (2013.01); *B01F 15/00175* (2013.01); *B28C 5/422* (2013.01); *B28C 5/4237* (2013.01); *B28C 5/46* (2013.01); *B28C 7/12* (2013.01); *C04B 22/06* (2013.01); *C04B 22/10* (2013.01); *C04B 40/0231* (2013.01); *G01F 1/00* (2013.01); *G01F 1/86* (2013.01); *B01F 2215/0047* (2013.01); *Y02P 40/18* (2015.11)

(58) Field of Classification Search
CPC ....... C04B 40/0231; C04B 22/06; B28C 5/00; B28C 5/422; B28C 5/4237; B01F 15/00136; B01F 15/00162; B01F 3/04099; B01F 13/0037; B01F 3/04439; B01F 9/00; B01F 15/00175; B01F 2215/0047; B01F 7/12; B01F 15/00142; G01F 1/00; G01F 1/86

See application file for complete search history.

(56) References Cited

U.S. PATENT DOCUMENTS

| | | | |
|---|---|---|---|
| 461,888 | A | 10/1891 | Richardson |
| 1,932,150 | A | 10/1933 | Tada |
| 2,254,016 | A | 8/1941 | Melton et al. |
| 2,259,830 | A | 10/1941 | Osborne |
| 2,329,940 | A | 9/1943 | Ponzer |
| 2,496,895 | A | 2/1950 | Staley |
| 2,498,513 | A | 2/1950 | Cuypers |
| 2,603,352 | A | 7/1952 | Tromp |
| 3,002,248 | A | 10/1961 | Willson |
| 3,184,037 | A | 5/1965 | Greaves et al. |
| 3,356,779 | A | 12/1967 | Schulze |
| 3,358,342 | A | 12/1967 | Spence |
| 3,442,498 | A | 5/1969 | Noah |
| 3,468,993 | A | 9/1969 | Knud |
| 3,492,385 | A | 1/1970 | Branko |
| 3,667,242 | A | 6/1972 | Robert |
| 3,752,314 | A | 8/1973 | Brown et al. |
| 3,757,631 | A | 9/1973 | McManus et al. |
| 3,917,236 | A | 11/1975 | Hanson |
| 3,957,203 | A * | 5/1976 | Bullard ................. B05B 13/06 118/317 |
| 4,068,755 | A | 1/1978 | Parkes et al. |
| 4,069,063 | A | 1/1978 | Ball |
| 4,076,782 | A | 2/1978 | Yazawa et al. |
| 4,093,690 | A | 6/1978 | Murray |
| 4,117,060 | A | 9/1978 | Murray |
| 4,257,710 | A * | 3/1981 | Delcoigne ................. B01F 3/12 366/131 |
| 4,266,921 | A | 5/1981 | Murray |
| 4,275,836 | A | 6/1981 | Egger |
| 4,350,567 | A | 9/1982 | Moorehead et al. |
| 4,362,679 | A | 12/1982 | Malinowski |
| 4,420,868 | A | 12/1983 | McEwen et al. |
| 4,427,610 | A | 1/1984 | Murray |
| 4,436,498 | A | 3/1984 | Murray |
| 4,526,534 | A | 7/1985 | Wollmann |
| 4,588,299 | A | 5/1986 | Brown et al. |
| 4,613,472 | A | 9/1986 | Svanholm |
| 4,746,481 | A | 5/1988 | Schmidt |
| 4,772,439 | A | 9/1988 | Trevino-Gonzalez |
| 4,789,244 | A * | 12/1988 | Dunton ................... B28C 5/386 366/101 |
| 4,846,580 | A | 7/1989 | Oury |
| 4,881,347 | A | 11/1989 | Mario et al. |
| 4,917,587 | A | 4/1990 | Alpar et al. |
| 4,944,595 | A | 7/1990 | Hodson |
| 5,051,217 | A | 9/1991 | Alpar et al. |
| 5,158,996 | A | 10/1992 | Valenti |
| 5,162,402 | A | 11/1992 | Ogawa et al. |
| 5,203,919 | A | 4/1993 | Bobrowski et al. |
| 5,220,732 | A | 6/1993 | Lee |
| 5,232,496 | A * | 8/1993 | Jennings ............. B01F 7/00908 106/638 |
| 5,244,498 | A * | 9/1993 | Steinke ............ B01F 15/00032 106/708 |
| 5,257,464 | A | 11/1993 | Trevino-Gonzales |
| 5,298,475 | A * | 3/1994 | Shibata ................. B01D 53/62 423/230 |
| 5,356,579 | A | 10/1994 | Jennings et al. |
| 5,358,566 | A | 10/1994 | Tanaka et al. |
| 5,360,660 | A | 11/1994 | Nohlgren |
| 5,393,343 | A | 2/1995 | Darwin et al. |
| 5,427,617 | A | 6/1995 | Bobrowski et al. |
| 5,453,123 | A | 9/1995 | Burge et al. |
| 5,458,470 | A | 10/1995 | Mannhart et al. |
| 5,494,516 | A | 2/1996 | Drs et al. |
| 5,505,987 | A | 4/1996 | Jennings et al. |
| 5,518,540 | A | 5/1996 | Jones, Jr. |
| 5,583,183 | A | 12/1996 | Darwin et al. |
| 5,609,681 | A | 3/1997 | Drs et al. |
| 5,612,396 | A | 3/1997 | Valenti et al. |
| 5,624,493 | A | 4/1997 | Wagh et al. |
| 5,633,298 | A | 5/1997 | Arfaei et al. |
| 5,643,978 | A | 7/1997 | Darwin et al. |
| 5,650,562 | A | 7/1997 | Jones, Jr. |
| 5,660,626 | A | 8/1997 | Ohta et al. |
| 5,661,206 | A | 8/1997 | Tanaka et al. |
| 5,665,158 | A | 9/1997 | Darwin et al. |
| 5,667,298 | A | 9/1997 | Musil et al. |
| 5,668,195 | A | 9/1997 | Leikauf |
| 5,669,968 | A | 9/1997 | Kobori et al. |
| 5,674,929 | A | 10/1997 | Melbye |
| 5,676,905 | A | 10/1997 | Andersen et al. |
| 5,690,729 | A | 11/1997 | Jones, Jr. |
| 5,703,174 | A | 12/1997 | Arfaei et al. |
| 5,725,657 | A | 3/1998 | Darwin et al. |
| 5,728,207 | A | 3/1998 | Arfaei et al. |
| 5,744,078 | A | 4/1998 | Soroushian et al. |
| 5,752,768 | A * | 5/1998 | Assh ....................... B28C 5/422 366/3 |
| 5,753,744 | A | 5/1998 | Darwin et al. |
| 5,798,425 | A | 8/1998 | Albrecht et al. |
| 5,800,752 | A | 9/1998 | Charlebois |
| 5,804,175 | A | 9/1998 | Ronin et al. |
| 5,840,114 | A | 11/1998 | Jeknavorian et al. |
| 5,873,653 | A | 2/1999 | Paetzold |

(56) References Cited

U.S. PATENT DOCUMENTS

| | | | |
|---|---|---|---|
| 5,882,190 A | 3/1999 | Doumet | |
| 5,885,478 A | 3/1999 | Montgomery et al. | |
| 5,912,284 A | 6/1999 | Hirata et al. | |
| 5,935,317 A | 8/1999 | Soroushian et al. | |
| 5,947,600 A | 9/1999 | Maeda et al. | |
| 5,965,201 A | 10/1999 | Jones, Jr. | |
| 6,008,275 A | 12/1999 | Moreau et al. | |
| 6,042,258 A * | 3/2000 | Hines | B28C 7/024 366/8 |
| 6,042,259 A * | 3/2000 | Hines | B28C 7/024 366/17 |
| 6,063,184 A | 5/2000 | Leikauf et al. | |
| 6,066,262 A | 5/2000 | Montgomery et al. | |
| 6,113,684 A | 9/2000 | Kunbargi | |
| 6,136,950 A | 10/2000 | Vickers, Jr. et al. | |
| 6,187,841 B1 | 2/2001 | Tanaka et al. | |
| 6,264,736 B1 | 7/2001 | Knopf et al. | |
| 6,267,814 B1 | 7/2001 | Bury et al. | |
| 6,284,867 B1 | 9/2001 | Vickers, Jr. et al. | |
| 6,290,770 B1 | 9/2001 | Moreau et al. | |
| 6,310,143 B1 | 10/2001 | Vickers, Jr. et al. | |
| 6,318,193 B1 * | 11/2001 | Brock | G01N 1/08 73/864.74 |
| 6,334,895 B1 | 1/2002 | Bland | |
| 6,372,157 B1 | 4/2002 | Krill, Jr. et al. | |
| 6,387,174 B2 | 5/2002 | Knopf et al. | |
| 6,451,105 B1 | 9/2002 | Turpin, Jr. | |
| 6,463,958 B1 | 10/2002 | Schwing | |
| 6,517,631 B1 | 2/2003 | Bland | |
| 6,648,551 B1 | 11/2003 | Taylor | |
| 6,871,667 B2 | 3/2005 | Schwing et al. | |
| 6,890,497 B2 | 5/2005 | Rau et al. | |
| 6,936,098 B2 | 8/2005 | Ronin | |
| 6,960,311 B1 | 11/2005 | Mirsky et al. | |
| 6,997,045 B2 * | 2/2006 | Wallevik | B01F 7/063 73/54.28 |
| 7,003,965 B2 | 2/2006 | Auer et al. | |
| 7,201,018 B2 | 4/2007 | Gershtein et al. | |
| 7,390,444 B2 | 6/2008 | Ramme et al. | |
| 7,399,378 B2 | 7/2008 | Edwards et al. | |
| 7,419,051 B2 | 9/2008 | Damkjaer et al. | |
| 7,549,493 B1 | 6/2009 | Jones | |
| 7,588,661 B2 | 9/2009 | Edwards et al. | |
| 7,704,349 B2 | 4/2010 | Edwards et al. | |
| 7,735,274 B2 | 6/2010 | Constantz et al. | |
| 7,736,430 B2 | 6/2010 | Barron et al. | |
| 7,771,684 B2 | 8/2010 | Constantz et al. | |
| 7,815,880 B2 * | 10/2010 | Constantz | C01B 31/24 106/713 |
| 7,879,146 B2 | 2/2011 | Raki et al. | |
| 7,906,086 B2 | 3/2011 | Comrie | |
| 7,914,685 B2 | 3/2011 | Constantz et al. | |
| 7,922,809 B1 | 4/2011 | Constantz et al. | |
| 7,950,841 B2 * | 5/2011 | Klein | B01F 15/063 366/4 |
| 8,006,446 B2 | 8/2011 | Constantz et al. | |
| 8,043,426 B2 | 10/2011 | Mohamed et al. | |
| 8,105,558 B2 | 1/2012 | Comrie | |
| 8,114,214 B2 | 2/2012 | Constantz et al. | |
| 8,114,367 B2 | 2/2012 | Riman et al. | |
| 8,118,473 B2 | 2/2012 | Cooley et al. | |
| 8,137,455 B1 | 3/2012 | Constantz et al. | |
| 8,157,009 B2 | 4/2012 | Patil et al. | |
| 8,177,909 B2 | 5/2012 | Constantz et al. | |
| 8,192,542 B2 | 6/2012 | Virtanen | |
| 8,235,576 B2 * | 8/2012 | Klein | B01F 15/063 366/10 |
| 8,272,205 B2 * | 9/2012 | Estes | C04B 28/02 366/147 |
| 8,287,173 B2 | 10/2012 | Khouri | |
| 8,311,678 B2 | 11/2012 | Koehler et al. | |
| 8,313,802 B2 | 11/2012 | Riman et al. | |
| 8,333,944 B2 | 12/2012 | Constantz et al. | |
| 8,470,275 B2 * | 6/2013 | Constantz | C01B 31/24 106/713 |
| 8,491,858 B2 | 7/2013 | Seeker et al. | |
| 8,518,176 B2 | 8/2013 | Silva et al. | |
| 8,584,864 B2 | 11/2013 | Lee et al. | |
| 8,708,547 B2 * | 4/2014 | Bilger | B28C 5/468 366/105 |
| 8,709,960 B2 | 4/2014 | Riman et al. | |
| 8,721,784 B2 | 5/2014 | Riman et al. | |
| 8,746,954 B2 | 6/2014 | Cooley et al. | |
| 8,845,940 B2 | 9/2014 | Niven et al. | |
| 8,989,905 B2 * | 3/2015 | Sostaric | B01F 15/00207 361/1 |
| 9,061,940 B2 * | 6/2015 | Chen | C04B 12/00 |
| 9,108,883 B2 * | 8/2015 | Forgeron | B29B 7/603 |
| 9,376,345 B2 * | 6/2016 | Forgeron | C04B 40/0231 |
| 9,388,072 B2 * | 7/2016 | Niven | C04B 7/26 |
| 9,448,094 B2 * | 9/2016 | Downie | G01F 1/76 |
| 9,463,580 B2 * | 10/2016 | Forgeron | B29B 7/603 |
| 9,492,945 B2 * | 11/2016 | Niven | C04B 28/02 |
| 2002/0019459 A1 | 2/2002 | Albrecht et al. | |
| 2002/0047225 A1 | 4/2002 | Bruning et al. | |
| 2002/0179119 A1 * | 12/2002 | Harmon | B01F 15/00032 134/22.18 |
| 2003/0122273 A1 | 7/2003 | Fifield | |
| 2005/0131600 A1 * | 6/2005 | Quigley | A62C 27/00 701/32.8 |
| 2007/0171764 A1 * | 7/2007 | Klein | B01F 15/063 366/4 |
| 2007/0185636 A1 | 8/2007 | Cooley et al. | |
| 2007/0215353 A1 | 9/2007 | Barron et al. | |
| 2008/0092957 A1 * | 4/2008 | Rosaen | B28C 5/4206 137/101.19 |
| 2008/0174041 A1 | 7/2008 | Firedman et al. | |
| 2008/0202389 A1 | 8/2008 | Hojaji et al. | |
| 2008/0245274 A1 * | 10/2008 | Ramme | B01D 53/62 106/679 |
| 2008/0308133 A1 | 12/2008 | Grubb et al. | |
| 2008/0316856 A1 | 12/2008 | Cooley et al. | |
| 2009/0093328 A1 | 4/2009 | Dickinger et al. | |
| 2009/0103392 A1 * | 4/2009 | Bilger | B28C 5/468 366/4 |
| 2009/0143211 A1 | 6/2009 | Riman et al. | |
| 2009/0292572 A1 * | 11/2009 | Alden | G05B 19/0428 366/2 |
| 2009/0294079 A1 | 12/2009 | Edwards et al. | |
| 2010/0132556 A1 * | 6/2010 | Constantz | B01D 53/1425 95/234 |
| 2010/0239487 A1 * | 9/2010 | Constantz | B01D 53/1418 423/430 |
| 2010/0246312 A1 * | 9/2010 | Welker | B01F 3/04439 366/4 |
| 2011/0067600 A1 | 3/2011 | Constantz et al. | |
| 2011/0165400 A1 | 7/2011 | Quaghebeur et al. | |
| 2011/0198369 A1 | 8/2011 | Klein et al. | |
| 2011/0289901 A1 * | 12/2011 | Estes | C04B 28/02 60/274 |
| 2011/0320040 A1 | 12/2011 | Koehler et al. | |
| 2012/0238006 A1 | 9/2012 | Gartner et al. | |
| 2012/0312194 A1 | 12/2012 | Riman et al. | |
| 2013/0036945 A1 * | 2/2013 | Constantz | C04B 22/10 106/463 |
| 2013/0122267 A1 | 5/2013 | Riman et al. | |
| 2013/0125791 A1 * | 5/2013 | Fried | B28C 5/02 106/705 |
| 2013/0139727 A1 | 6/2013 | Constantz et al. | |
| 2013/0167756 A1 | 7/2013 | Chen et al. | |
| 2013/0284073 A1 | 10/2013 | Gartner | |
| 2014/0034452 A1 | 2/2014 | Lee et al. | |
| 2014/0069302 A1 | 3/2014 | Saastamoinen et al. | |
| 2014/0083514 A1 * | 3/2014 | Ding | G05D 7/0647 137/12 |
| 2014/0096704 A1 | 4/2014 | Rademan et al. | |
| 2014/0104972 A1 | 4/2014 | Roberts et al. | |
| 2014/0107844 A1 | 4/2014 | Koehler et al. | |
| 2014/0116295 A1 | 5/2014 | Niven et al. | |
| 2014/0127450 A1 | 5/2014 | Riman et al. | |

(56) References Cited

U.S. PATENT DOCUMENTS

| | | | | |
|---|---|---|---|---|
| 2014/0197563 A1* | 7/2014 | Niven | B01D 53/62 | 264/69 |
| 2014/0216303 A1* | 8/2014 | Lee | C04B 22/10 | 106/638 |
| 2014/0327168 A1 | 11/2014 | Niven et al. | | |
| 2014/0373755 A1* | 12/2014 | Forgeron | B29B 7/603 | 106/638 |
| 2015/0023127 A1* | 1/2015 | Chon | C01F 5/24 | 366/167.1 |
| 2015/0069656 A1 | 3/2015 | Bowers et al. | | |
| 2015/0197447 A1* | 7/2015 | Forgeron | C04B 40/0231 | 106/638 |
| 2015/0232381 A1* | 8/2015 | Niven | C04B 7/26 | 106/709 |
| 2015/0247212 A1 | 9/2015 | Sakaguchi et al. | | |
| 2015/0298351 A1* | 10/2015 | Beaupre | B28C 7/0418 | 366/7 |
| 2015/0355049 A1* | 12/2015 | Ait Abdelmalek | H01H 33/563 | 702/45 |
| 2016/0001462 A1* | 1/2016 | Forgeron | B29B 7/603 | 366/3 |
| 2016/0107939 A1* | 4/2016 | Monkman | C04B 40/0231 | 106/638 |
| 2016/0185662 A9 | 6/2016 | Niven et al. | | |
| 2016/0272542 A1* | 9/2016 | Monkman | B28C 5/0806 | |
| 2016/0280610 A1* | 9/2016 | Forgeron | C04B 40/0231 | |
| 2016/0340253 A1* | 11/2016 | Forgeron | B29B 7/603 | |
| 2016/0355441 A1* | 12/2016 | Tregger | C04B 40/0032 | |
| 2016/0355442 A1* | 12/2016 | Niven | C04B 40/0231 | |
| 2017/0015598 A1 | 1/2017 | Monkman et al. | | |
| 2017/0028586 A1* | 2/2017 | Jordan | B28C 7/026 | |
| 2017/0036372 A1 | 2/2017 | Sandberg et al. | | |
| 2017/0043499 A1* | 2/2017 | Forgeron | B01F 5/0655 | |
| 2017/0158569 A1* | 6/2017 | Lee | C04B 40/0032 | |
| 2017/0165870 A1* | 6/2017 | Niven | B28B 17/02 | |

FOREIGN PATENT DOCUMENTS

| | | |
|---|---|---|
| CA | 970935 A1 | 7/1975 |
| CA | 1045073 A | 12/1978 |
| CA | 1185078 A1 | 4/1985 |
| CA | 2027216 A1 | 4/1991 |
| CA | 2343021 * | 3/2000 |
| CA | 2343021 A1 | 3/2000 |
| CA | 2362631 * | 8/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| DE | 1817001 A1 | 11/1970 |
| DE | 3139107 A1 | 4/1983 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0573524 B1 | 5/1996 |
| EP | 0701503 B1 | 8/2000 |
| EP | 1429096 A2 | 6/2004 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 1749629 B1 | 5/2013 |
| EP | 2123441 B1 | 7/2013 |
| EP | 2107000 B1 | 9/2013 |
| EP | 2031010 B1 | 4/2014 |
| EP | 2123808 B1 | 5/2014 |
| EP | 2036952 B1 | 4/2016 |
| EP | 1985754 B1 | 8/2016 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A1 | 10/1982 |
| FR | 2513932 A1 | 4/1983 |
| FR | 2735804 A1 | 12/1996 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2300631 A | 11/1996 |
| GB | 2302090 A | 1/1997 |
| GB | 2392502 A | 3/2004 |
| JP | S56115423 A | 9/1981 |
| JP | S5850197 A | 3/1983 |
| JP | S60187354 A | 9/1985 |
| JP | S6150654 A | 3/1986 |
| JP | S62122710 A | 6/1987 |
| JP | S6426403 A | 1/1989 |
| JP | H0218368 A | 1/1990 |
| JP | H0254504 U | 4/1990 |
| JP | H05116135 A | 5/1993 |
| JP | H05117012 A | 5/1993 |
| JP | H0624329 A | 2/1994 |
| JP | H06144944 A | 5/1994 |
| JP | H0748186 A | 9/1994 |
| JP | H06263562 A | 9/1994 |
| JP | H07275899 A | 10/1995 |
| JP | H0835281 A | 2/1996 |
| JP | H0960103 A | 3/1997 |

(56) References Cited

FOREIGN PATENT DOCUMENTS

| | | |
|---|---|---|
| JP | H09124099 A | 5/1997 |
| JP | H10194798 A | 7/1998 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2002012480 A | 1/2002 |
| JP | 2002127122 A | 5/2002 |
| JP | 2003326232 A | 11/2003 |
| JP | 2005023692 A | 1/2005 |
| JP | 2005273720 A | 10/2005 |
| JP | 2007326881 A | 12/2007 |
| JP | 2008096409 A | 4/2008 |
| JP | 2009115209 A | 5/2009 |
| JP | 4313352 B2 | 8/2009 |
| KR | 20020006222 A | 1/2002 |
| KR | 20020042569 A | 6/2002 |
| KR | 20020090354 A | 12/2002 |
| KR | 20030004243 A | 1/2003 |
| KR | 20060064557 A | 6/2006 |
| KR | 100766364 B1 | 10/2007 |
| NZ | 183790 A | 9/1980 |
| RU | 2168412 C2 | 6/2001 |
| RU | 2212125 C2 | 9/2003 |
| RU | 2351469 C2 | 4/2009 |
| SE | 8002613 L | 3/1982 |
| SE | 451067 B | 8/1987 |
| SU | 1031728 A2 | 7/1983 |
| TW | I257330 B | 7/2006 |
| WO | WO-7900473 A1 | 7/1979 |
| WO | WO-8500587 A1 | 2/1985 |
| WO | WO-9105644 A1 | 5/1991 |
| WO | WO-9215753 A1 | 9/1992 |
| WO | WO-9427797 A1 | 12/1994 |
| WO | WO-0190020 A2 | 11/2001 |
| WO | WO-2004033793 A2 | 4/2004 |
| WO | WO-2004074733 A1 | 9/2004 |
| WO | WO-2005025768 A1 | 3/2005 |
| WO | WO-2006040503 A1 | 4/2006 |
| WO | WO-2006100550 A1 | 9/2006 |
| WO | WO-2006100693 A1 | 9/2006 |
| WO | WO-2008149389 A1 | 12/2008 |
| WO | WO-2008149390 A1 | 12/2008 |
| WO | WO-2009078430 A1 | 6/2009 |
| WO | WO-2009089906 A1 | 7/2009 |
| WO | WO 2009089906 A1 * 7/2009 | ........... C04B 18/142 |
| WO | WO-2009132692 A1 | 11/2009 |
| WO | WO-2010074811 A1 | 7/2010 |
| WO | WO-2012079173 A1 | 6/2012 |
| WO | WO 2012081486 A1 * 6/2012 | ............ C04B 28/02 |
| WO | WO-2012081486 A1 | 6/2012 |
| WO | WO-2014026794 A1 | 2/2014 |
| WO | WO 2014121198 A1 * 8/2014 | ............ C04B 22/10 |
| WO | WO-2014121198 A1 | 8/2014 |
| WO | WO-2014205577 A1 | 12/2014 |
| WO | WO-2015123769 A1 | 8/2015 |

OTHER PUBLICATIONS

Bhatia, et al. Effect of the Product Layer on the kinetics of the CO2-lime reaction. AIChE Journal. 1983; 29(1):79-86.

Chang, et al. The experimental investigation of concrete carbonation depth. Cement and Concrete Research. 2006; 36(9):1760-1767.

Chen, et al. On the kinetics of Portland cement hydration in the presence of selected chemical admixtures. Advances in Cement Research. 1993; 5(17):9-13.

Dewaele, et al. Permeability and porosity changes associated with cement grout carbonation. Cement and Concrete Research. 1991; 21(4):441-454.

Estes-Haselbach. The greenest concrete mixer—carbon sequestration in freshly mixed concrete. Sep. 25, 2012.

Eurpoean search report and search opinion dated Jan. 14, 2015 for EP 11849437.6.

Fernandez-Bertos, et al. A review of accelerated carbonation technology in the treatment of cement-based materials and sequestration of CO2. Journal of Hazardous Materials B112. 2004; 193-205.

Fluid Hole and Size. Newton: Ask a Scientist. Jan. 24, 2005. Retrieved from http://www.newton.dep.anl.gov/askasci/eng99/eng99365.htm on Jul. 13, 2013.

Freedman, S. Carbonation Treatment of Concrete Masonry Units. Modern Concrete. 1969; 33(5):33-6.

Goodbrake, et al. Reaction of Hydraulic Calcium Silicates with Carbon Dioxide and Water. Journal of the American Ceramic Society. 1979; 62(9-10):488-491.

Goto, et al. Calcium Silicate Carbonation Products. Journal of the American Ceramic Society. 1995; 78(11):2867-2872.

Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.

Hesson, et al. Flow of two- phase carbon dioxide through orifices. AIChE Journal 4.2 (1958): 207-210.

Huijgen, et al. Mineral CO2 sequestration by steel slag carbonation. Environmental Science and Technology. 2005; 39(24):9676-9682.

Huntzinger, et al. Carbon dioxide sequestration in cement kiln dust through mineral carbonation. Environ Sci Technol. Mar. 15, 2009;43(6):1986-92.

Hurst. Canadian cement plant becomes first to capture CO2 in algae. Earth and Industry. Pond Biofuels press release. Mar. 19, 2010.

Iizuka, et al. Development of a new CO2 sequestration process utilizing the carbonation of waste cement. Industrial & Engineering Chemistry Research. 2004; (43)24:7880-7887.

International search report and written opinion dated Jan. 25, 2016 for PCT Application No. PCTCA2015/051220.

International search report and written opinion dated Mar. 6, 2012 for PCT Application No. CA2011/050774.

International search report and written opinion dated May 4, 2015 for PCT/CA2015/050118.

International search report and written opinion dated Jul. 16, 2015 for PCT Application No. PCT/CA2015/000158.

International search report and written opinion dated Jul. 16, 2015 for PCT Application No. PCT/CA2015/050318.

International search report and written opinion dated Jul. 18, 2013 for PCT Application No. CA2013/050190.

International search report and written opinion dated Sep. 18, 2014 for PCT/CA2014/050611.

Kashef-Haghighi, et al. Accelerated Concrete Carbonation, a CO2 Sequestration Technology. 8th World Congress of Chemical Engineering WCCE8. Aug. 24, 2009.

Kashef-Haghighi, et al. CO2 sequestration in concrete through accelerated carbonation curing in a flow-through reactor. Ind. Eng. Chem. Res. 2010; 49:1143-1149.

Lange, et al. Preliminary investigation into the effects of carbonation on cement-solidified hazardous wastes. Environmental Science and Technology. 1996; 30(1):25-30.

Logan, C. Carbon dioxide absorption and durability of carbonation cured cement and concrete compacts. Thesis. Department of Civil Engineering, McGill University. Montreal, QC, Canada. 2006.

Mehta. "Concrete Carbonation". Materials World Magazine. Oct. 1, 2008 [Retrieved on Jul. 13, 2013] Retrieved from http://www.iom3.org/news/concrete-carbonation.

Monkman, et al. Assessing the Carbonation Behavior of Cementitious Materials. J. Mater. Civ. Eng. 2006; 18(6), 768-776.

Monkman, et al. Carbonated Ladle Slag Fines for Carbon Uptake and Sand Substitute. Journal of Materials in Civil Engineering. Nov. 2009;657-665.

Monkman, et al. Carbonation Curing of Slag-Cement Concrete for Binding CO2 and Improving Performance. Journal of Materials in Civil Engineering. Apr. 2010; 296-304.

Monkman, et al. Integration of carbon sequestration into curing process of precast concrete. Can. J. Civ. Eng. 2010; 37:302-310.

(56) References Cited

OTHER PUBLICATIONS

Monkman, G. S. Investigating Carbon Dioxide Sequestration in Fresh Ready Mixed Concrete. International Symposium on Environmentally Friendly Concrete—ECO-Crete Aug. 13-15, 2014, Reykjavik, Iceland.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhosue gas mitigation technology. These from the Department of Civil Engineering and Applied Mechanics. McGill University, Montreal, Canada. Oct. 2006.
Notice of allowance dated Feb. 26, 2016 for U.S. Appl. No. 14/642,536.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 25, 2016 for U.S. Appl. No. 14/642,536.
Notice of allowance dated May 11, 2016 for U.S. Appl. No. 14/701,456.
Notice of allowance dated Jun. 24, 2015 for U.S. Appl. No. 14/249,308.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Mar. 7, 2016 for U.S. Appl. No. 14/796,751.
Office action dated Mar. 10, 2015 for U.S. Appl. No. 14/249,308.
Office action dated Mar. 28, 2013 for U.S. Appl. No. 13/660,447.
Office action dated Apr. 26, 2016 for U.S. Appl. No. 14/950,288.
Office action dated Jul. 15, 2013 for U.S. Appl. No. 13/660,447.
Office action dated Jul. 30, 2015 for U.S. Appl. No. 14/282,965.
Office action dated Aug. 14, 2015 for U.S. Appl. No. 14/701,456.
Office action dated Aug. 18, 2015 for U.S. Appl. No. 14/642,536.
Office action dated Oct. 5, 2015 for U.S. Appl. No. 14/701,456.
Office action dated Dec. 2, 2015 for U.S. Appl. No. 14/282,965.
Office action dated Dec. 7, 2015 for U.S. Appl. No. 14/796,751.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.
Phipps and MacDonald. Sustainability Leads to Durability in the New I-35W Bridge. Concrete International. Feb. 2009; vol. 31 Issue 2, p. 27-32.
Preliminary Amendment dated Nov. 1, 2013 for U.S. Appl. No. 13/994,681.
Reardon, et al. High pressure carbonation of cementitious grout. Cement and Concrete Research. 1989; 19(3):385-399.
Sato, et al. Seeding effect of nano-CaCO3 on the hidration of tricalcium silicate, Transportation Research Record. 2010; 2141:61-67.
Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.
Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference. 2010.

Shi, et al. Studies on some factors affecting CO2 curing of lightweight concrete products. Resources, Conservation and Recycling. 2008; (52)8-9:1087-1092.
Shideler, J. Investigation of the moisture-volume stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Sorochkin, et al. Study of the possibility of using carbon dioxide for accelerating the hardening of products made from Portland Cement. J. Appl. Chem. USSR. 1975; 48:1271-1274.
Steinour, H. Some effects of carbon dioxide on mortars and concrete-discussion. Journal of the American Concrete Institute. 1959; 30:905-907.
Technology Roadmap: Cement. International Energy Agency. Dec. 2009 [Retrieved on Jul. 13, 2013]. Retrieved from http://www.iea.org/publications/freepublications/publication/name,3861,en.html.
Teir, et al. Carbonation of Finnish magnesium silicates for CO2 sequestration. Fifth Annual Conference on Carbon Capture and Sequestration. May 8-11, 2006. National Energy Technology Laboratory, Department of Energy, USA.
Toennies, et al. Artificial carbonation of concrete masonry units. American Concrete Institute Journal. 1960; 31(8):737-755.
U.S. Appl. No. 14/701,456, filed Apr. 30, 2015.
U.S. Appl. No. 14/796,751, filed Jul. 10, 2015.
U.S. Appl. No. 14/950,288, filed Nov. 24, 2015.
U.S. Appl. No. 61/976,360, filed Apr. 7, 2014.
U.S. Appl. No. 61/980,505, filed Apr. 16, 2014.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society.. 1974; 57(9):394-397.
Author Unknown, "Splicing Solution," Quarry Management, Oct. 2002, 3 pages.
"Clear Edge Filtration—Screen and Filter, Process Belts, and Screen Print," Mining-Techology.com, no date, [retrieved on May 25, 2010]. Retrieved from: http/www.mining- technology.com/contractors/filtering/clear-edge/, 2 pages.
Co-pending U.S. Appl. No. 15/240,954, filed on Aug. 18, 2016.
Co-pending U.S. Appl. No. 15/284,186, filed on Oct. 3, 2016.
Co-pending U.S. Appl. No. 15/304,208, filed on Oct. 14, 2016.
Dorbian "Nova Scotia-based CArbonCure garners $3.5 min in Series B funds," Reuters PE HUB, Dec. 11, 2013, 6 pages, found at http://www.pehub.com/2013/12/nova-scotia-based-carboncure-garners-3-5-min-in-series-b-funds/.
Gager, "Trumbull Corp.: Charleroi Lock & Dam," Construction Today, 2010, [retrieved on May 25, 2010]. Retrieved from http://www.construction-today.com/cmsl/content/view/1909/104/, 2 pages.
"Glenium® 3400 NV: High-Range Water-Reducing Admixture," BASF, Product Data, Jun. 2010, 2 pages.
International Search Report and Written Opinion dated Aug. 30, 2016 for International application No. PCT/CA2016/050773.
International Search Report and Written Opinion dated Oct. 19, 2016 for International Application No. PCT/CA2016/051062.
International search report dated May 16, 2014 for PCT Application No. PCT/US14/14447.
Kawashima, et al. Dispersion of CaCO3 Nanoparticles by Sonication and Surfactant Treatment for Application in Fly Ash-Cement Systems. Materials and Structures. May 28, 2013. DOI 10.1617/S11527-013-0110-9.
Kim, et al. Properties of cement-based mortars substituted by carbonated fly ash and carbonated under supercritical conditions. IJAER. 9(24), 25525-25534 (2014).
Lomboy, et al. Atom Probe Tomography for Nanomodified Portland Cement. Nanotechnology in Construction. Springer International Publishing, 2015. 79-86.

(56) References Cited

OTHER PUBLICATIONS

"Mb-Aetm 90: Air-Entraining Admixture" BASF, Product Data, Apr. 11, 2 pages, found at http://www.basf-admixtures.com/en/products/airentraining/mbae_90/pages/default.aspx.
Notice of allowance dated Mar. 29, 2016 for U.S. Appl. No. 14/701,456.
Notice of allowance dated May 6, 2016 for U.S. Appl. No. 14/796,751.
Notice of allowance dated Jul. 5, 2016 for U.S. Appl. No. 14/282,965.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Office Action dated Jun. 16, 2016 for U.S. Appl. No. 13/994,681.
Office action dated Aug. 12, 2016 for U.S. Appl. No. 14/950,288.
Office action dated Sep. 2, 2016 for U.S. Appl. No. 15/228,964.
Office action dated Sep. 28, 2016 for U.S. Appl. No. 15/157,205.
Office Action dated Dec. 29, 2016 for U.S. Appl. No. 15/157,205.
Office Action dated Dec. 30, 2016 for U.S. Appl. No. 13/994,681.
"Pozzolith® 200N: Water-Reducing Admixture," BASF, Product Data, Sep. 2010, 2 pages, found at http://www.basf-admixtures.com/en/products/waterreducingretarding/pozzolith200n/pp./default.aspx.
"Pozzolith® 322 N: Water-Reducing Admixture," BASF, Product Data, Mar. 2007, 2 pages.
Sato, et al. Effect of Nano-CaCO3 on Hydration of Cement Containing Supplementary Cementitious Materials. Institute for Research in Construction, National Research Council Canada. Oct. 2010.
Tri-Cast literature, Dry cast machine. Besser Company. Sioux, Iowa, USA. 06-09.
U.S. Appl. No. 62/096,018, filed Dec. 23, 2014.
U.S. Appl. No. 61/839,312, filed Jun. 25, 2013.
U.S. Appl. No. 61/847,254, filed Jul. 17, 2013.
U.S. Appl. No. 61/879,049, filed Sep. 17, 2013.
U.S. Appl. No. 61/925,100, filed Jan. 8, 2014.
U.S. Appl. No. 61/938,063, filed Feb. 10, 2014.
U.S. Appl. No. 61/941,222, filed Feb. 18, 2014.
U.S. Appl. No. 61/992,089, filed May 12, 2014.
European search report with written opinion dated Feb. 2, 2017 for EP2951122.
European search report with written opinion dated Jan. 20, 2017 for EP14818442.
International search report with written opinion dated Jul. 3, 2016 for PCT/CA2015/050195.
Office action dated Feb. 27, 2017 for U.S. Appl. No. 14/171,350.
Office action dated Mar. 7, 2017 for U.S. Appl. No. 15/434,429.
Office action dated Mar. 14, 2017 for U.S. Appl. No. 15/228,964.
Office action dated May 10, 2017 for U.S. Appl. No. 13/994,681.
Notice of allowance dated Jun. 15, 2017 for U.S. Appl. No. 15/157,205.
Notice of allowance dated Jun. 30, 2017 for U.S. Appl. No. 15/434,429.
Office action dated Jul. 3, 2017 for U.S. Appl. No. 14/171,350.

* cited by examiner

1. ¼" Aluminum handle with vacuum jacketed hose running from CCT system to lance
2. ½" Aluminum lance, same piece of aluminum as 1, that attaches to the concrete truck mount
3. 1" PVC to allow easy insertion of the lance into the mount
4. metal plug to prevent PVC from sliding off into the truck during mixing
5. ¼" Aluminum rod that extends into the mixing drum
6. 1" Steel mount that is welded to the concrete trucks
7. ¼" Steel pipe to align the lance at the proper angle into the mixing drum
8. Metal sensing proximity switch that triggers the CCT system once the lance has been inserted

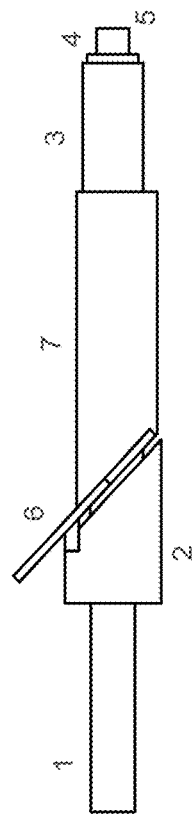

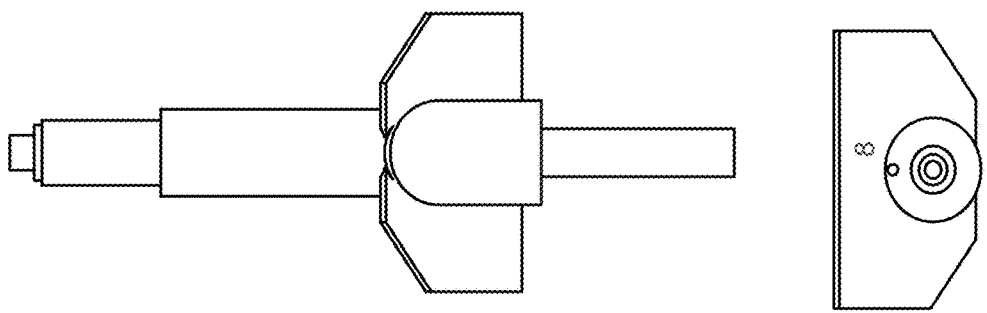

Figure 6

APPARATUS FOR DELIVERY OF CARBON DIOXIDE TO A CONCRETE MIX IN A MIXER AND DETERMINING FLOW RATE

CROSS-REFERENCE

This application is a divisional of U.S. patent application Ser. No. 14/642,536, (now U.S. Pat. No. 9,376,345), filed Mar. 9, 2015, which claims priority to U.S. Provisional Patent Application Ser. Nos. 61/992,089, filed May 12, 2014; 62/086,024, filed Dec. 1, 2014; 62/083,784, filed Nov. 24, 2014; 62/096,018, filed Dec. 23, 2014. U.S. patent application Ser. No. 14/642,536 is also a continuation-in part of PCT Application No. PCT/CA2014/050611, filed Jun. 25, 2014, which is a continuation-in-part of U.S. patent application Ser. No. 14/249,308 (now U.S. Pat. No. 9,108,883), filed Apr. 9, 2014. Both PCT Application No. PCT/CA2014/050611 and U.S. patent application Ser. No. 14/249,308, claim priority to U.S. Provisional Patent Application Ser. No. 61/839,312, filed Jun. 25, 2013, U.S. Provisional Patent Application Ser. No. 61/847,254, filed Jul. 17, 2013, U.S. Provisional Patent Application Ser. No. 61/879,049, filed Sep. 17, 2013, U.S. Provisional Patent Application Ser. No. 61/925,100, filed Jan. 8, 2014, and U.S. Provisional Patent Application Ser. No. 61/938,063, filed Feb. 10, 2014. Moreover, PCT Application No. PCT/CA2014/050611 also claims priority to U.S. Provisional Patent Application Ser. No. 61/980,505, filed Apr. 16, 2014. Each of the abovementioned applications is entirely incorporated herein by reference.

BACKGROUND OF THE INVENTION

Cement mixes, such as concrete mixes, are used in a multitude of compositions and procedures throughout the world. In addition, greenhouse gases such as carbon dioxide are a growing concern worldwide. There is a need for methods and compositions to contact cement mixes with carbon dioxide and for cement mixes containing incorporated carbon dioxide and carbonation products.

In certain situations in which a mixture of solid and gaseous carbon dioxide is delivered by forcing pressurized liquid carbon dioxide, or a mixture of gaseous and liquid carbon dioxide, through an orifice to a lower pressure environment, it is desirable to determine the flow rate of the carbon dioxide and/or total amount of carbon dioxide delivered without the use of, e.g., changes in weight of carbon dioxide source container or containers, which can be inaccurate at small doses, or, e.g., a mass flow controller or other direct measurement of flow. In addition, it is often desirable to deliver such a mixture of solid and gaseous carbon dioxide to a mix, such as a cement mix, using apparatus and methods to optimize the uptake of the carbon dioxide into the mix, especially at low doses of carbon dioxide.

SUMMARY OF THE INVENTION

In one aspect, the invention provides apparatus. In certain embodiments, the invention provides an apparatus for determining a flow rate of carbon dioxide, comprising i) a delivery line through which flows gaseous carbon dioxide, liquid carbon dioxide, or a combination of gaseous and liquid carbon dioxide; ii) an orifice at the distal end of the delivery line, through which the carbon dioxide exits from the delivery line, wherein the diameter of the delivery line as it joins the orifice is $D_p$ and the diameter of the orifice is $D_o$, and wherein $D_o$ is less than $D_p$; iii) a first temperature sensor proximal to the orifice and configured to detect a first temperature, T, of carbon dioxide in the delivery line and to transmit the detected first temperature to a flow rate calculation system; iv) a pressure sensor proximal to the orifice and configured to detect a pressure, $P_u$, of carbon dioxide in the delivery line and to transmit the detected pressure to the flow rate calculation system; v) a second temperature sensor distal to the orifice and configured to detect a second temperature, $T_D$, of carbon dioxide exiting the orifice and to transmit the detected second temperature to the flow rate calculation system. The apparatus of can further comprise vi) the flow rate calculation system, wherein the flow rate calculation system is configured to a) at a first time, determine from $T_D$ whether the carbon dioxide in the delivery line when it reaches the orifice is 100% gas or 100% liquid, or a mix of gas and liquid, and b) calculate an instantaneous flow rate for the first time, wherein 1) when the carbon dioxide in the delivery line as it is delivered to the orifice is 100% gas or 100% liquid, the flow rate is calculated from $D_p$, $D_o$, and $P_u$, and T for the first time and 2) when the carbon dioxide in the delivery line as it is delivered to the orifice is a mixture of gas and liquid, the flow rate is calculated from $D_o$, $P_u$, T, and $T_D$ at the first time. The apparatus can further comprise a mixer for mixing concrete or a container containing a material used in concrete, wherein the apparatus is configured to deliver carbon dioxide to the mixer or the container. In certain embodiments, the apparatus comprises a mixer for mixing concrete, such as a transportable mixer, for example the drum of a ready-mix truck. In certain embodiments the mixer comprises a stationary mixer. The apparatus can further comprise a conduit operably connected to the distal end of the orifice and configured to direct the carbon dioxide to a destination. In certain embodiments, the conduit is attached to the ready-mix truck. In certain embodiments, not attached to a ready-mix truck. In certain embodiments, the flow rate calculation system is configured to calculate the flow rate of carbon dioxide at a plurality of times or time intervals, each of which has its own $P_u$, T, and $T_D$, which may be the same or different than the $P_u$, T, and $T_D$ of the other times. In certain embodiments, the flow calculation system is configured to calculate a total amount of carbon dioxide that has flowed through the orifice based on the instantaneous flow rates for the plurality of times or time intervals. In certain embodiments, the flow rate calculation system outputs the total amount of carbon dioxide to a system controller. In certain embodiments, the system controller compares the total amount of carbon dioxide to a predetermined end amount of carbon dioxide, and when the total amount is equal to or greater than the predetermined end amount, sends a signal to one or more actuators configured to modulate the flow of carbon dioxide through the orifice to cause the one or more actuators to modulate the flow of carbon dioxide, for example to slow or cease flow of the flow of carbon dioxide. In certain embodiments, the source of gaseous carbon dioxide and the source of liquid carbon dioxide are the same. In certain embodiments, the source of gaseous carbon dioxide and the source of liquid carbon dioxide are different.

In certain embodiments the invention provides a system for delivering carbon dioxide to a drum of a ready-mix truck comprising (i) a rigid or semi-rigid conduit comprising a proximal end and a distal end, wherein the conduit is configured to be operably connected to a source of carbon dioxide at its proximal end and for delivery of the carbon dioxide from its distal end to a drum of a ready-mix truck; and (ii) a guide affixed to the ready-mix truck, wherein the guide is configured to reversibly attach the conduit to the ready-mix truck and to position the distal end of the conduit at a desired position in the drum of the ready-mix truck in order to deliver carbon dioxide from the carbon dioxide source to concrete mixing within the drum. The guide can be configured to position the distal end of the conduit to within 10-40 cm of the surface of the mixing concrete, on average, when the drum of the ready-mix truck contains a full load of concrete. The system can further comprise the source of carbon dioxide. The source of carbon dioxide can be a source of liquid carbon dioxide, and the system can further comprise an orifice operably connected to the proximal end of the rigid or semi-rigid conduit, wherein the orifice is operably connected to the source of carbon dioxide and is configured to convert the liquid carbon dioxide from the source of carbon dioxide to solid and gaseous carbon dioxide for delivery through the conduit to the concrete. The orifice can be operably connected to the proximal end of the rigid or semi-rigid conduit by a flexible conduit, where the orifice is positioned at a proximal end of the flexible conduit and the proximal end of the rigid or semi-rigid conduit is attached to a distal end of the flexible conduit. The orifice can comprise a temperature sensor for sensing the temperature of the mixture of solid and gaseous carbon dioxide exiting the orifice.

In another aspect, the invention provides methods.

In certain embodiments, the invention provides a method for determining a flow rate of carbon dioxide in a system where a mixture of liquid and gaseous carbon dioxide is delivered via a conduit to an orifice, wherein the orifice has a cross-sectional area, and exits the orifice as a mixture of gaseous and solid carbon dioxide, comprising (i) determining a first temperature, $T_D$, of the carbon dioxide exiting the orifice; (ii) determining a pressure, $P_u$ of the carbon dioxide in the conduit proximal to the orifice; (iii) determining a second temperature, T, of the carbon dioxide in the conduit proximal to the orifice; (iv) at a first time, determining the proportions of liquid carbon dioxide in the total carbon dioxide delivered to the orifice from $T_D$ at the first time; (v) determining the flow rate for the carbon dioxide delivered to the orifice at the first time from $P_u$, T, and $T_D$ at the first time, and the diameter, $D_o$, of the orifice, the proportion of liquid carbon dioxide delivered to the orifice. In certain embodiments, the determining is performed in less than 100 ms. In certain embodiments, the determining is performed in less than 20 ms. In certain embodiments, the determining is performed in less than 5 ms. The method may further comprise performing steps (i) through (v) at least 100 times subsequent to the first time. The method may further comprise performing steps (i) through (v) at least 1000 times subsequent to the first time. In certain embodiments, a plurality of flow rates are determined at a plurality of times, and the total amount of carbon dioxide delivered is determined from the plurality of flow rates and the times.

In certain embodiments, the invention provides a method of carbonating a flowable concrete mix comprising i) delivering carbon dioxide to the concrete mix; wherein the carbon dioxide is delivered as a mixture of gaseous and solid carbon dioxide for at least part of the delivery time wherein the carbon dioxide is delivered by a method comprising a) the carbon dioxide is delivered via a delivery line with diameter $D_p$ to an orifice with diameter $D_o$, and through the orifice, optionally also through a conduit attached to the orifice, to the concrete mix, b) carbon dioxide is supplied to the delivery line by flowing pressurized gaseous carbon dioxide to the delivery line via a carbon dioxide gas line and/or flowing pressurized liquid carbon dioxide to the delivery line via a carbon dioxide liquid line, so that at least part of the carbon dioxide reaching the orifice during delivery of the carbon dioxide to the concrete mix is liquid carbon dioxide, c) the carbon dioxide exits the orifice as a gas, a solid, or a mixture thereof, ii) determining a total amount of carbon dioxide delivered to the concrete mix by a method comprising a) determining a pressure of the carbon dioxide, $P_u$, in the delivery line proximal to the orifice at a plurality of times, b) determining a first temperature of the carbon dioxide, T, in the delivery line proximal to the orifice at the plurality of times, c) determining a second temperature of the carbon dioxide, $T_D$, as it exits the orifice at the plurality of times; wherein, for each time of the plurality of times, all of $P_u$, T, and $T_D$ are measured at the same time, d) determining from $T_D$ for each time whether the carbon dioxide in the delivery line when it reaches the orifice is 100% gas or 100% liquid, or a mix of gas and liquid, e) calculating an instantaneous flow rate for each time, wherein 1) when the carbon dioxide in the delivery line as it is delivered to the orifice for a time is 100% gas or 100% liquid, the flow rate is calculated from $D_p$, $D_o$, $P_u$ and T for that time, and 2) when the carbon dioxide in the delivery line as it is delivered to the orifice for a time is a mixture of gas and liquid, the flow rate is calculated from $D_o$, $P_u$, T, and $T_D$ for that time, f) integrating the flow rates for the plurality of times to obtain a total amount of carbon dioxide delivered; and iii) modulating the delivery of the carbon dioxide to the concrete mix based at least in part on the total amount of carbon dioxide delivered determined in ii) f). In certain embodiments, the modulation of delivery of the carbon dioxide comprising halting the delivery of carbon dioxide when the total amount of carbon dioxide delivered is greater than or equal to a predetermined amount of carbon dioxide.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2a. Only gas valve open; FIG. 2b. Gas and liquid valves open; FIG. 2c. Only liquid valve open, temperature of carbon dioxide distal to orifice −20 to −56° C.; FIG. 2d. Only liquid valve open, temperature of carbon dioxide distal to orifice −56 to −78° C.

FIG. 6 shows one example of a wand for delivering carbon dioxide to a mixer, e.g., a drum of a ready-mix truck, and a holder or holster for insertion and positioning of the wand. View 1: Top view. View 2: End view. View 3: Side view. 1: ¼" Aluminum handle with vacuum jacketed hose running from liquid carbon dioxide system to wand; 2: ½" Aluminum wand, same piece of aluminum as 1, that attaches to the concrete truck mount; 3: ¼" PVC to allow easy insertion of the wand into the mount; 4: Metal plug to prevent PVC from sliding off into the truck during mixing; 5: ¼" Aluminum rod that extends into the mixing drum; 6: ¼" Steel mount that is welded to the concrete trucks; 7: ¼" Steel pipe to align the wand at the proper angle into the mixing drum; 8: Metal sensing proximity switch that triggers the carbon dioxide delivery system once the wand has been inserted.

DETAILED DESCRIPTION OF THE INVENTION

Figure 1:
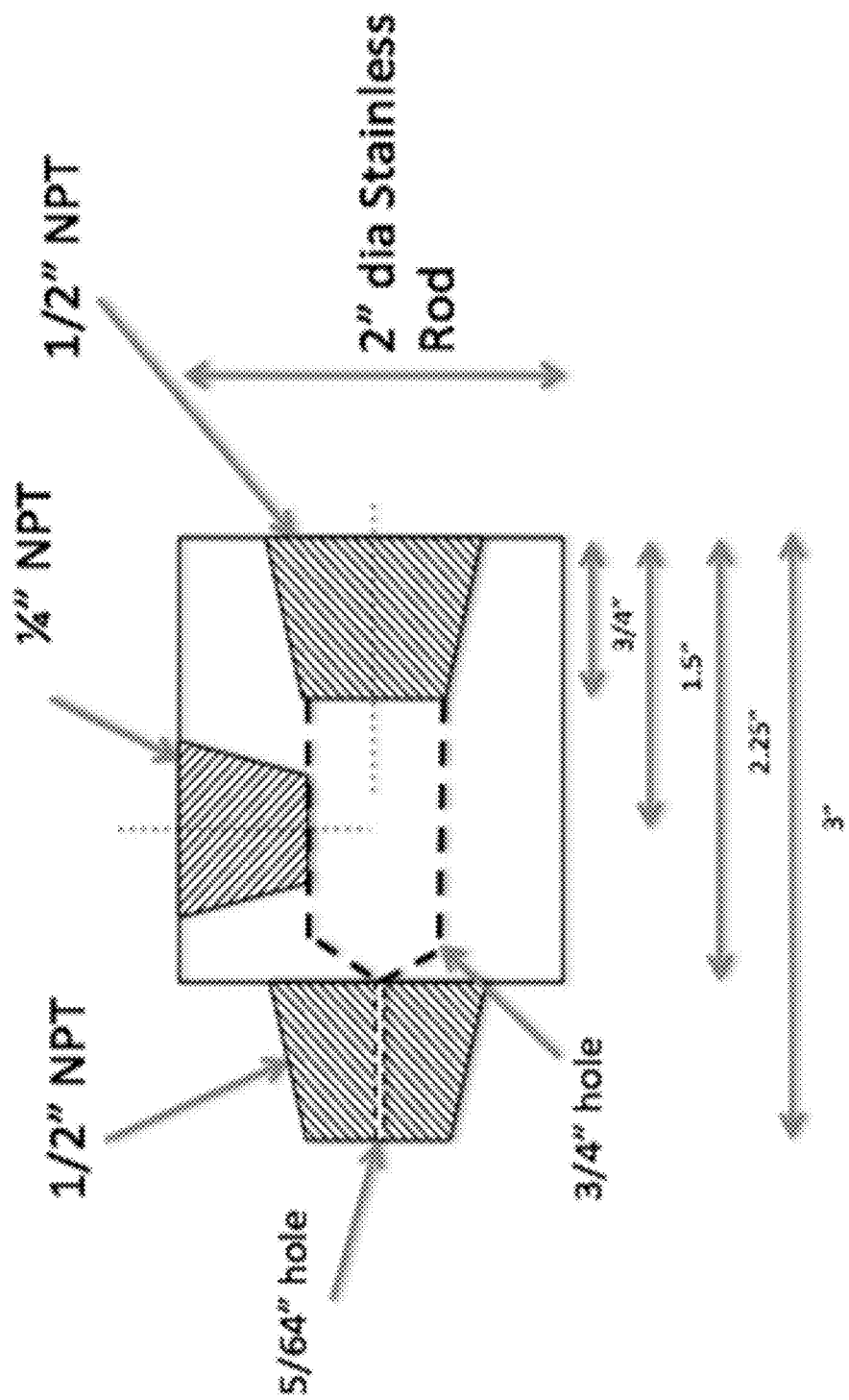
FIG. 1 shows a schematic representation of an exemplary orifice for delivery of carbon dioxide.

The invention provides compositions and methods for delivering carbon dioxide, e.g., to a concrete mixing operation; in certain embodiments the invention provides compositions and methods for determining a flow rate of the carbon dioxide by measurement of temperature and pressure. In particular, the invention provides compositions and methods for delivering pressurized liquid and gaseous carbon dioxide to and through an orifice from high pressure to low pressure, e.g., atmospheric pressure, causing the liquid carbon dioxide to become a mixture of solid and gaseous carbon dioxide. Solid carbon dioxide is also referred to as "dry ice" herein. When a mixture of solid carbon dioxide and gaseous carbon dioxide is formed as a result of a sudden release of pressure of a liquid carbon dioxide, the solid carbon dioxide in the mixture is also referred to herein as "snow." The invention further provides compositions and methods for measuring the rate of delivery of carbon dioxide through the orifice that combine temperature and pressure measurements at various points to determine a total amount of carbon dioxide delivered. Control systems can be used to cause the flow to stop after a desired amount of carbon dioxide has been delivered through the orifice.

The compositions and methods of the invention find use anywhere that it is desired to deliver carbon dioxide, especially in the form of a mix of gaseous and solid carbon dioxide, and most especially in smaller amounts; in certain embodiments the methods and compositions of the invention include methods and compositions for delivery of carbon dioxide to a concrete mix, such as in a concrete mixer (e.g., a drum of a ready-mix truck, or a stationary mixer such as at a precast plant) or elsewhere, or to a component of a concrete mix, and for convenience the invention will be described in terms of these embodiments, however, it is understood that aspects of the invention, such as determining flow rates of carbon dioxide, are not confined to delivery of carbon dioxide to concrete mixes or components of concrete mixes and may be used in any operation in which carbon dioxide delivery, especially delivery of gas/solid carbon dioxide mixture, and/or measurement of flow rate and/or total amount delivered is desired. It is especially useful in systems in which a relatively small dose of carbon dioxide is desired, e.g., a system in which other means of determining total amount of carbon dioxide delivered, for example, by measuring the change in weight or mass of the carbon dioxide container, are not accurate enough to provide useful information; it will also be appreciated that measuring the change in weight of the source container is not an accurate measure of carbon dioxide actually delivered if any carbon dioxide in the delivery line is vented during delivery. It is also useful when the use of a mass controller, with concomitant necessity for pure liquid or pure gas in the delivery line at the point of flow measurement, is not feasible or desirable.

In general, carbon dioxide delivery in which flow is determined by certain compositions and methods of the invention involves the following steps: first, a delivery line with an orifice at its distal end is pressurized by introduction of gaseous carbon dioxide into the delivery line, to pressurize the line sufficiently that when liquid is introduced into the line, the pressure drop will not be such that solid carbon dioxide is formed, e.g., pressurized to a certain minimum pressure that is such that the pressure difference between it and the pressure of the liquid carbon dioxide is not sufficient to cause solid carbon dioxide formation; often a certain safety cushion is added to the minimum pressure to ensure that no solid carbon dioxide forms. Next, liquid carbon dioxide is introduced into the delivery line; the gas flow continues briefly to ensure that there is no drop in pressure, and is then halted so that only liquid is supplied to the delivery line. When it is desired to halt the liquid flow, gaseous carbon dioxide is again briefly introduced into the delivery line and the delivery of liquid carbon dioxide to the line is halted. The burst of gas into the line serves to push all liquid out of the orifice. Thus, in sequence during the simplest case of delivery of carbon dioxide to the orifice, only gas is delivered, a mixture of gas and liquid is delivered, only liquid is delivered, a mixture of gas and liquid, and finally only gas. On exiting the orifice, the liquid carbon dioxide experiences a pressure change from high pressure in the delivery line (e.g., 300 psi) to atmospheric pressure. The liquid is not stable at atmospheric pressure and it undergoes a transition to gas and solid carbon dioxide.

An exemplary orifice is illustrated in FIG. 1. The dimensions are for use in delivering carbon dioxide to a concrete mix for carbonation of the mix and are those useful in that operation, where a total dose of 1-5 L of liquid carbon dioxide may be delivered over a period of less than 5 minutes. It will be appreciated that smaller dimensions may be used for lower doses and larger dimensions for higher doses, and any suitable dimensions may be used. Of note is that the orifice comprises a connection for a temperature sensor, which measures the temperature of the carbon dioxide exiting the orifice; the carbon dioxide exiting the orifice is referred to herein as distal to the orifice or downstream of the orifice. In the orifice illustrated in FIG. 1, liquid $CO_2$ enters the orifice at the 5/64" diameter end. The ¼" National Pipe Thread Taper (NPT) connection is for a temperature sensor. The ½" NPT connection is for connection of a conduit to direct the carbon dioxide exiting the orifice to the desired location. For example, the conduit may be used to direct carbon dioxide to a particular location in a concrete mixer, such as a particular location in a drum of a ready-mix truck. Certain embodiments of the invention provide one or more of an orifice as described, a conduit operably connected to the orifice to direct the carbon dioxide exiting the orifice, and, in some embodiments, a system for positioning the conduit so as to direct the carbon dioxide to a particular location, for example, a particular location in a drum of a ready-mix truck; the conduit apparatus may be affixed to the drum in a permanent or, preferably, temporary configuration. Certain embodiments of the invention provide for the positioning system itself, alone or affixed to a mixer, e.g., a ready-mix truck, or a plurality of positioning systems, each affixed to a separate mixer, e.g., to separate ready-mix trucks. Thus, for example, in a ready-mix operation, each truck that is designated as a potential receiver of carbon dioxide may have its own positioning system, e.g., a holster, affixed thereto in such a location as to position the conduit to deliver carbon dioxide to a desired location inside the drum of the truck while concrete is mixing in the drum, so that the conduit may be temporarily attached to different ready-mix trucks as desired to deliver carbon dioxide to the different trucks. Hence, in certain embodiments, the invention provides systems and methods for delivery of carbon dioxide to the drums of one or more ready-mix trucks where each truck to which carbon dioxide is to be delivered has affixed thereto a positioning system that travels with the truck, and a carbon dioxide delivery systems, for example as described herein, that includes a conduit for delivery of carbon dioxide from a source of carbon dioxide to the ready-mix truck, where each positioning system is affixed in a location and position such that the conduit may be temporarily attached to the truck and positioned in such a way as to allow carbon dioxide to be delivered to a desired location within the drum of the truck, for example, while concrete is mixing in the drum of the truck. Locations and positioning may be as described herein. The system may include at least 1, 2, 3, 4, 5, 6, 7, 8, 9, 10, 12, 15, 20, 25, 30, 40, or 50 separate ready-mix trucks, each with its own positioning system attached, and 1 or, in some cases, more than 1, such as 2, 3, 4, 5, or more than 5 carbon dioxide delivery systems that include a conduit that may be temporarily attached to the trucks for delivery of carbon dioxide from a source of carbon dioxide to the drum of the truck. The carbon dioxide delivery system may be positioned, when in use, at a location where the truck or trucks normally halt for a period sufficient to deliver a desired dose of carbon dioxide to the concrete in the truck, for example, at a location where the trucks normally halt for at least 1, 2, 3, 4, 5, 6, 7, 8, 9, or 10 minutes. For example, the delivery system may be positioned at a wash rack in a batching facility. In this way, carbon dioxide can be delivered to the trucks without significantly altering the time the trucks remain in the batching facility, as it is delivered during an operation that would normally take place, e.g., washing the trucks, and the only potential additional time would be in the attachment and detachment of the conduit, and in some cases the starting and stopping of delivery of the carbon dioxide, if done by the truck driver. Thus, the system and methods may allow delivery of a desired dose of carbon dioxide to the ready-mix trucks, such as a dose of 0.05-2% bwc, or any other dose as described herein, without prolonging the average time that a truck remains in the batching facility by more than 1, 2, 3, 4, 5, 6, 7, 8, 9, or 10 minutes, for example, by no more than 2 minutes, or no more than 4 minutes, or no more than 6 minutes, on average. The carbon dioxide delivery system may be a liquid delivery system and further include an orifice that allows liquid carbon dioxide, or a mixture of liquid and gaseous carbon dioxide, under pressure, to be converted to solid and gaseous carbon dioxide as it passes through the orifice to an area of lower pressure, for example, to an area of atmospheric pressure, as described herein. Systems and methods for monitoring the flow of carbon dioxide, such as those described herein, may be included in the systems and methods of delivering carbon dioxide to the drums of ready-mix trucks. Systems and methods for controlling the flow of carbon dioxide, such as those described herein, such as starting, stopping, and/or otherwise modulating the flow, may be included in the systems and methods of delivering carbon dioxide to the drums of ready-mix trucks.

The compositions and methods of the invention include determination of a flow rate of carbon dioxide by measuring a temperature and a pressure in the delivery line proximal to the orifice; a temperature of the delivered carbon dioxide distal to the orifice is also measured to determine what proportion of liquid and gaseous carbon dioxide is being delivered to the orifice; if the delivery line diameter and the orifice diameter are known, the flow rate for liquid carbon dioxide and for gaseous carbon dioxide may be calculated; integration of the flow rate gives total amount of carbon dioxide delivered through the orifice in a given time. The temperature distal to the orifice is used to determine which phase (liquid or gas or both) is in the line and the equation settings are changed based on the phase to calculate the instantaneous flow rate. Integrating the flow over time allows the total amount of carbon dioxide delivered in that time to be calculated. In some cases a pressure distal to the orifice may also be used, if the pressure cannot be assumed to be atmospheric.

The temperature distal to (downstream of) the orifice is used in the following manner: When only the liquid valve is open in the system, 85-100% liquid is flowing through the orifice and allowed to expand to atmospheric pressure, a temperature at or below −56° C. is seen in the stream exiting the orifice. When 100% gas, e.g., from the head space above the liquid in a liquid pressurized portable liquid carbon dioxide tank (such as a Dewar) or other pressurized gaseous $CO_2$ source, is allowed to expand to atmospheric pressure, the resulting temperature seen in the stream exiting the orifice is at or above that given by the equation:

$$\text{Pressure}=544.181 e^{0.0324 * \text{Temp}(° C.)}$$

Above this temperature, the flow distal to the orifice is 100% gas, below this it is a mixture of gas and solid (meaning some liquid is flowing through the orifice) until a temp of −56° C. is reached, at which the flow to the orifice is 100% liquid. If the temperature distal to the orifice is between these values one may interpolate between the two temperatures to determine the % liquid vs gas being delivered to the orifice. This is a linear relationship, or can be estimated or represented as a line.

Figure 2:
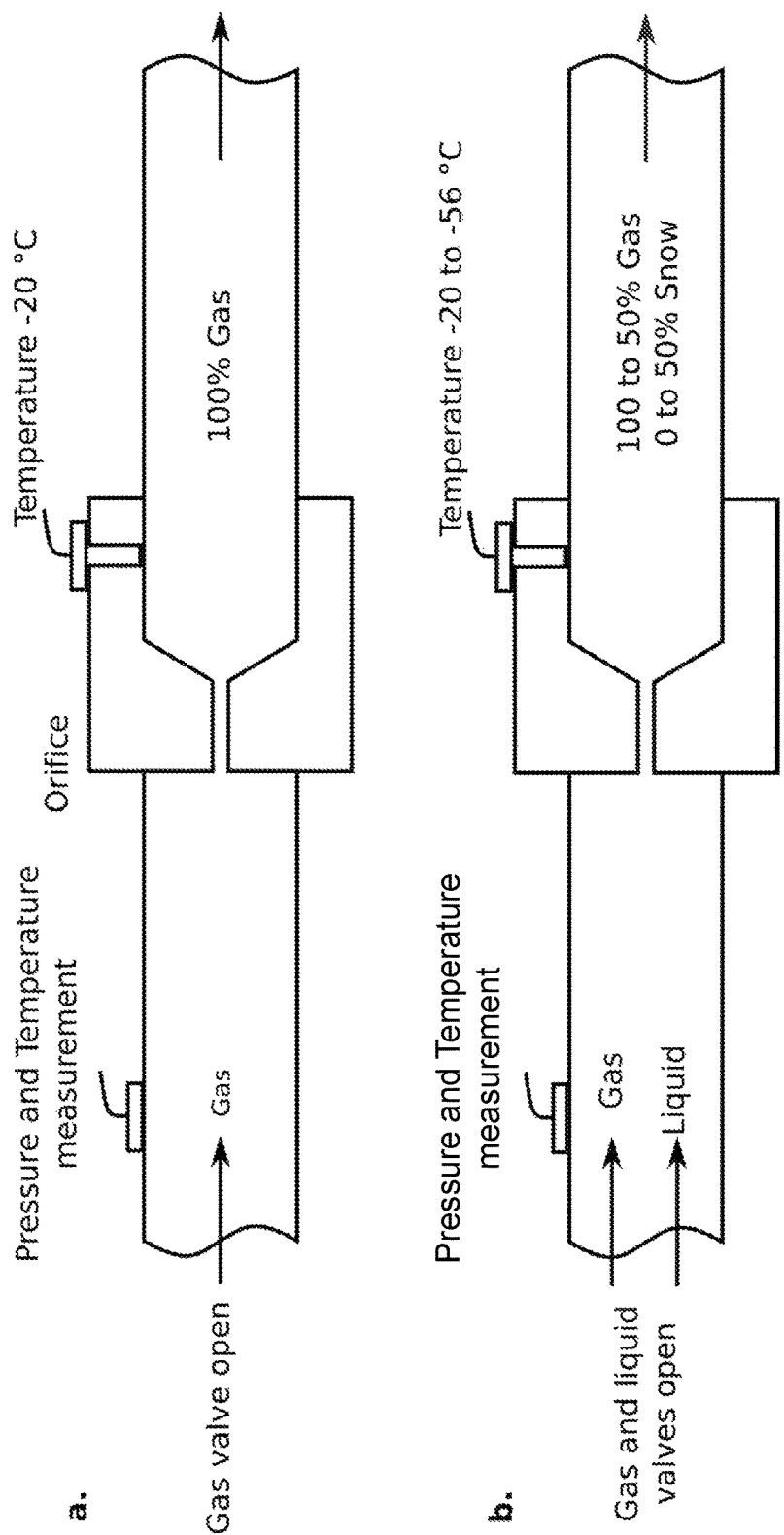
FIG. 2 is a representation of carbon dioxide flow in a delivery line and distal to an orifice at various points in a process for delivery of carbon dioxide.
Figure 2:
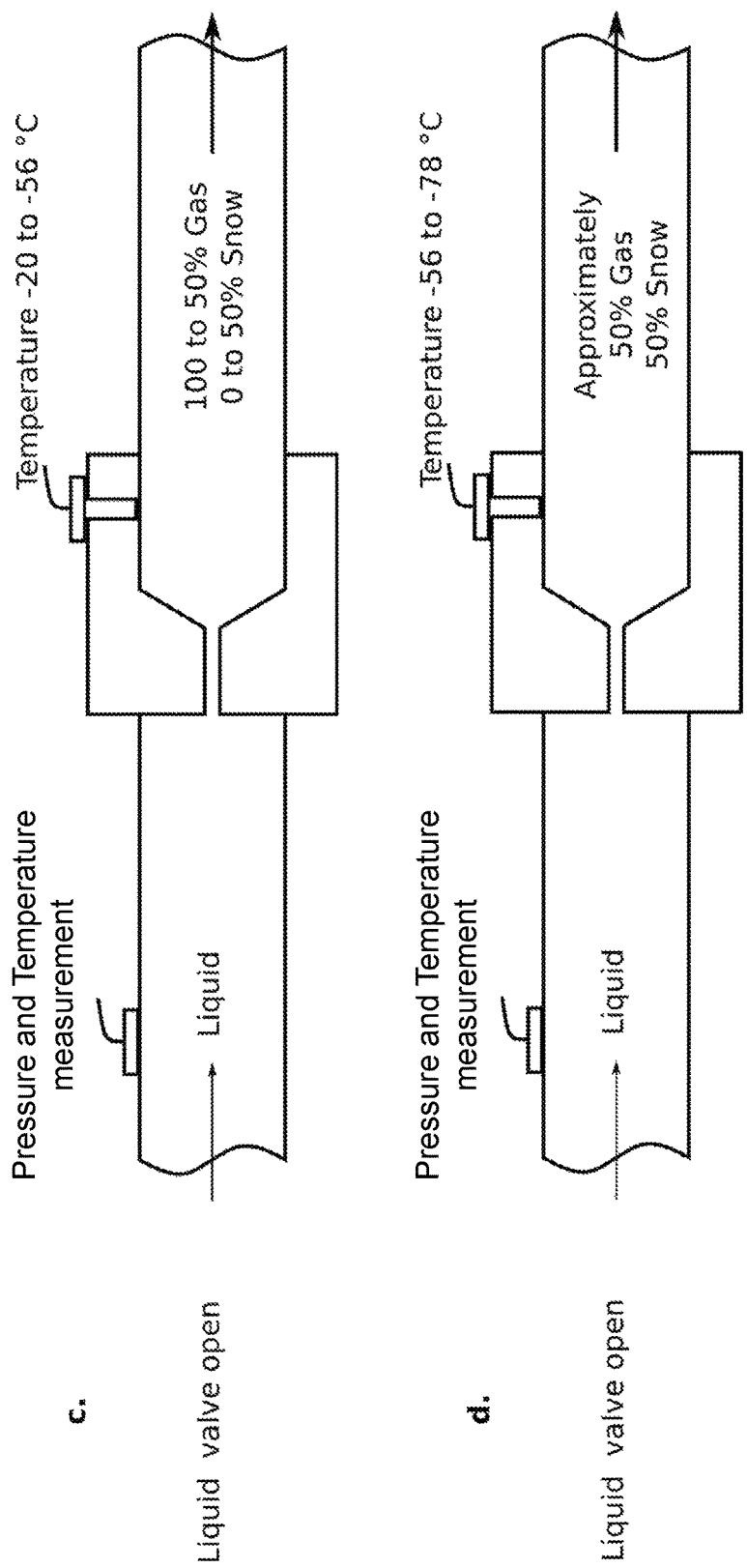

FIG. 2 illustrates various exemplary times in a carbon dioxide delivery process and the content of the delivery line (gas, liquid, mixture of gas and liquid) as well as the composition of the carbon dioxide exiting the orifice (gas, mixture of gas and solid), and the temperatures associated therewith. In FIG. 2a, the gas line valve is opened and gas purges the delivery line and brings it up to pressure. The gas is no colder than the temperature at which carbon dioxide would liquefy at the pressure in the line, e.g., no colder than −20° C. at 300 psi, and the carbon dioxide exiting the orifice is in gaseous form. Because the orifice diameter is much less than the diameter of the delivery line, the delivery line can be pressurized due to the back pressure at the orifice without closing off the orifice. In FIG. 2b the liquid valve is opened and the gas valve remains open in order to assure that the pressure remains high; there is a co-flow of gas and liquid in the delivery line. The temperature distal to the orifice decreases as liquid carbon dioxide is converted to solid and gas, and the carbon dioxide exiting the orifice is a mixture of gas and solid. In general this period is brief, as the gas valve quickly closes once the liquid valve opens, since it is no longer needed to keep the line pressurized. The temperature distal to the valve is between that of the gas and the liquid (−20 to −56° C.), depending on the proportions of gas and liquid reaching the orifice. In FIG. 2c, the gas valve has closed and only the liquid valve is open, and during this interval the remaining gas in the line is pushed out by liquid flow, so there is still a mixture of gas and liquid in the delivery line, (FIG. 2c shows only the liquid in the line, but it is preceded by a liquid/gas mixture). The temperature distal to the orifice reflects that flow is still not 100% liquid while the gas/liquid mixture is pushed out, and the proportion of gas and liquid in the carbon dioxide reaching the orifice can be determined based on the temperature distal to the orifice. This period is also brief, as it continues only until all gas is pushed out of the line, and a mixture of gas and solid dioxide exits the orifice. In FIG. 2d, only the liquid valve is open, all gas has been pushed out of the line, and there is full liquid flow in the delivery line to the orifice. The liquid carbon dioxide converts to approximately 50% gas and 50% solid carbon dioxide after orifice; this can range from about 40% to 60% solid depending on temperature and pressure. This period can be any desired period, e.g. if a large amount of carbon dioxide is to be delivered the period of 100% liquid flow in the delivery line can be long; for a small dose of carbon dioxide, the period can be brief. The temperature distal to the orifice will be between that of the liquid (−56° C.) and the solid carbon dioxide (−78° C.), depending on the proportions of gas and solid in the carbon dioxide exiting the orifice.

Not shown in FIG. 2 is the shutdown procedure, in which the gas valve opens, then the liquid valve closes, so that, again, both gas and liquid are in the delivery line and finally just gas, as the last of the liquid is forced out of the orifice, with the mixture of gas and solid and temperature of the mixture exiting the orifice reflecting the proportion of gas and liquid in the line. The final portion of carbon dioxide in the delivery line and exiting the orifice will be 100% gas, just as at the beginning of the delivery process.

It will be appreciated that when only the liquid valve is open and all gas from the period when the gas valve was opened is flushed from the system, the carbon dioxide in the delivery line that reaches the orifice can nonetheless be a mixture of liquid and gaseous carbon dioxide due to formation of gaseous carbon dioxide from liquid in the line, for a variety of reasons; for example, temperature losses in the supply line, from the liquid source to the delivery system, or pressure drops through piping and fittings due to changes in diameter. Thus, it cannot be assumed that flow is 100% liquid even after the gas valve has been closed for a significant time, and the downstream (distal) temperature must be relied on to establish the fraction of carbon dioxide in the delivery line as it reaches the orifice that is liquid vs. gas.

In addition, although the process has been described as one cycle, during any given period of carbon dioxide delivery it may be desired to modulate the delivery rate of the carbon dioxide. Since liquid carbon dioxide is approximately 500 times more dense than gaseous carbon dioxide, the gas valve may be opened to introduce gas into the carbon dioxide in the delivery line, with or without closure of the liquid valve, thus decreasing the proportion of liquid and decreasing delivery rate for the carbon dioxide.

The proportion of gas and liquid flow in the delivery line can be determined based on the temperature of the carbon dioxide exiting the orifice; for one-phase flow in the line, e.g., either 100% liquid flow or 100% gas flow, the equations below may be used to determine flow rate at any given time:

$$F_g = O_c * 15.4879 * D_o{}^2 * SQRT(16.086 * \rho_g * (P_u + 14.7))$$

used only when flow to orifice is one phase, 100% gas $$F_L = (64 * D_o){}^2 * 1.488 * P_u{}^{0.7022}$$

used only when flow to orifice is one phase, 100% liquid $$\rho_g = ((P_u + 14.7) * 0.04401 * 101325 * 1.8) / (14.7 * 0.993 * 8.314 * (T + 460))$$

$$O_c = 0.84 - (0.1636 * P_r)$$

$$P_r = (P_d + 14.7) / (P_u + 14.7)$$

$$P_d = (P_u * O_r) / (1 - O_r)$$

$$O_r = (D_o / D_p){}^4$$

where $F_g$=Gas Flow (standard liters per minute, SLPM); $F_L$=Liquid Flow (SLPM); $O_c$=Orifice Critical Flow; $\rho_g$=Gas Density; $P_u$=Upstream Pressure; T=Upstream Temperature in ° C.; $P_r$=Pressure Ratio; $P_d$=Downstream Pressure; $D_o$=Orifice Diameter; $D_p$=Pipe Diameter; and $O_r$=Orifice Ratio As described, when flow in the delivery line is nominally 100% liquid flow (i.e., liquid valve open, gas valve shut, all gas flushed from line), the actual flow can vary between about 85-100% liquid flow, that is, due to various conditions, up to 15% of the liquid in the line can convert to gas, assuming liquid up to the orifice and not heating in the line; if the supply line heats up due to, e.g., ambient temperature, etc., than this can be >15%. In addition, the percentage of carbon dioxide exiting the orifice that is solid can vary from 40-60% of the total carbon dioxide. Under conditions where the carbon dioxide in the delivery line as delivered to the orifice contains both the gas and the liquid phase, the following equation is used to determine flow at a given time:

$$F_{2P} = O_A * 19.7203 * ((SQRT((2*(P_u+14.7) * 101325 * \rho_L) / (14.7 * \% \ LCO_2 * 0.01)) * SQRT (C_{2P2} + (((100-\% \ LCO_2) * \rho_L * 0.55843)/(\% \ LCO_2 * \rho_g)))) / (C_{2P1} + (((100-\% \ LCO_2) * \rho_L * 1.5839)/(\% \ LCO_2 * \rho_g))))$$

used when flow to orifice is mixture of gas and liquid (2 phase)

$$\rho_L = (44.01 * 2.768) / (0.26212{}^{\wedge}((1.0-((T+273.15)/304.21)){}^{\wedge}0.2908)+1.0)$$

$$X_s = -0.00054863 P_u + 0.653 \text{ (solid can be 40-60\%)}$$

$$X_L = -0.0031774 T_D(° C.) + 0.82116 \text{ (liquid can be 85-100\%)}$$

$$\rho_L = (44.01 * 2.768) / (0.26212{}^{\wedge}((1.0-((T+273.15)/304.21)){}^{\wedge}0.2908)+1.0)$$

$$X_s = -0.00054863 P_u + 0.653 \text{ (solid can be 40-60\%)}$$

$$X_L = -0.0031774 T_D(° C.) + 0.82116 \text{ (liquid can be 85-100\%)}$$

$$100 * X_L = \% \ LCO_2$$

$$C_{2P1} = 0.55{}^{\wedge}(-1.0/L)$$

$$C_{2P2} = (1.0-(0.55{}^{\wedge}((L-1.0)/L))) * (L-1.0)$$

where $F_{2P}$=2 Phase Flow; $\rho_L$=Liquid $CO_2$ Density; $O_A$=Orifice Area; % $LCO_2$=Percent Liquid $CO_2$=$100*X_L$; $X_s$=Fraction of Solid $CO_2$ in total carbon dioxide exiting the orifice; $X_L$=Fraction of Liquid $CO_2$ in total carbon dioxide delivered to the orifice; $T_D$=Downstream Temperature; $P_u$=Upstream Pressure; T=Upstream Temperature in ° C.; $\rho_g$=Gas Density; $C_{2P1}$=Coefficient of 2 Phase Flow 1; and $C_{2P2}$=Coefficient of 2 Phase Flow 2

L=Coefficient of Expansion, from Table 1 and appropriate interpolation or extrapolation. See Hesson, J. C. and Peck, R. E., Flow of Two-phase Carbon Dioxide Through Orifices, American Institute of Chemical Engineers Journal Vol. 4, No. 2, June 1958, pg. 207-210:

TABLE 1

Coefficient of Expansion at various % $LCO_2$

| % $LCO_2$ | L |
|---|---|
| 0-80 | 1.0 |
| 90 | 1.1 |
| 95 | 1.3 |
| 97.5 | 3.0 |

The flow rate can be determined for a succession of times; the interval between one flow determination and another is limited only by the speed at which values for $P_u$, T, $T_D$ may be determined and the speed at which the calculations to determine flow performed. In certain embodiments, the interval between flow rate determinations is 0.01-100 ms, for example, 0.1-10 ms, such as 0.5-5 ms. At a time interval of 1 millisecond (ms) between flow rate determinations, 1000 determinations per second may be made. For a succession of flow rates, flow rate may be integrated over time to give total carbon dioxide delivered in that time.

The calculations to determine flow rate and/or total amount of carbon dioxide delivered in a given time may be performed by any suitable apparatus capable of the requisite speed of calculation, such as a computer, e.g., a programmable logic controller (PLC). It will be appreciated that the calculation apparatus will perform calculations based on the inputs it receives for $P_u$, T, and $T_D$ at any particular time, but, due to the fact that each is measured by a different sensor and transmitted to the calculation apparatus separately, the actual time of each measurement for $P_u$, T, and $T_D$ may be slightly different; for the purposes of this description, measurements of $P_u$, T, and $T_D$, and any other measurements that may be used in the calculation of a flow rate, are considered to be at "the same time" if they are all used by the calculation apparatus to calculate a flow rate for that time, even though they may not have been measured at precisely the same time or at precisely the time at which the calculation apparatus performs the calculation.

Any suitable apparatus, as known in the art or that may be developed, may be used to deliver the gaseous and liquid carbon dioxide to the delivery line and to determine the temperatures and pressure proximal (upstream) to the orifice and temperature distal (downstream) of the orifice (and, optionally, pressure downstream of the orifice if it cannot be assumed to be atmospheric pressure), and, as described above, to perform the necessary calculations to determine a flow rate and/or total amount of carbon dioxide delivered. The source of the gaseous carbon dioxide may be any suitable source, such as a container that contains both liquid and gaseous carbon dioxide and from which gaseous carbon dioxide can be withdrawn. For smaller operations, the container can be, e.g., a pressurized portable liquid carbon dioxide tank (such as a Dewar). The source of the liquid carbon dioxide may be any suitable source, such as a container that contains liquid carbon dioxide and from which liquid carbon dioxide can be withdrawn. For smaller operations, the container can be, e.g., a pressurized portable liquid carbon dioxide tank (such as a Dewar). The sources may be the same, e.g., a container that contains both liquid and gaseous carbon dioxide where the gaseous carbon dioxide is withdrawn at one port and the liquid carbon dioxide at another.

Figure 3:
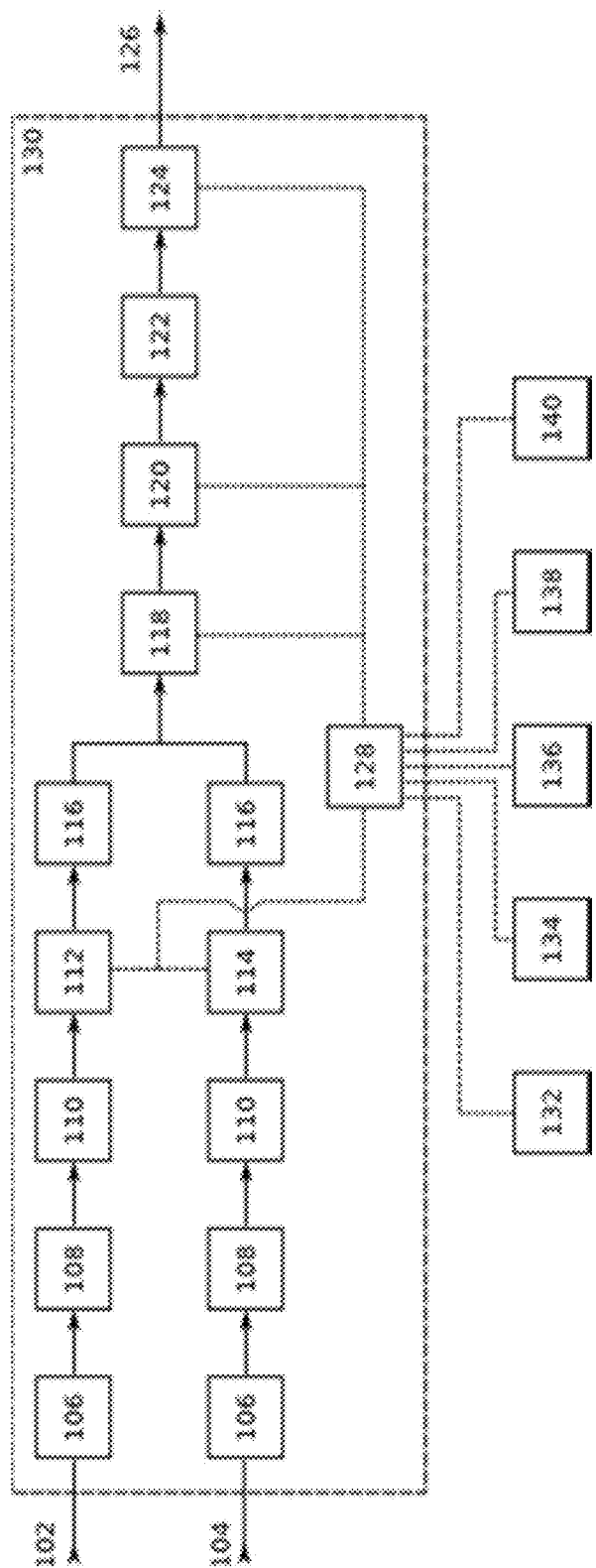
FIG. 3 shows a generalized representation of a carbon dioxide delivery system.

Certain embodiments of compositions of the invention may be understood in reference to FIG. 3: A gas line [102] and liquid line [104] are input into the valve assembly. Each line has a ball valve [106], pressure gauge [108] and pressure relief valve [110] leading into a solenoid valve, sometimes referred to herein as a solenoid. When $CO_2$ is to be delivered through the orifice, the gas solenoid [112] opens briefly, e.g., for 0.1-10 seconds, to pressurize the piping prior to opening the liquid valve. Once the outlet line is pressurized the liquid solenoid [114] opens and the gas solenoid [112] closes soon thereafter, e.g., 0.1-5 seconds later; in certain cases, the liquid solenoid and gas solenoid may open at the same time, depending on the pressure in the line. When the liquid valve is to close, the gas solenoid [112] opens briefly, e.g., for 0.1-5 seconds (or longer, depending on the distance between the solenoid and the orifice; the time is sufficient to empty the line, which will depend on the configuration), and the liquid solenoid [114] closes. The gas solenoid [112] remains open for another brief period, e.g., for 0.1-10 seconds. Prior to liquid injection gas is used to pressurize the pipe between the solenoid and the orifice [122] to ensure that pressure is sufficient to ensure that the incoming liquid remains liquid. After the liquid injection phase, the gas is used to push all the liquid out of the orifice and clear the liquid from the pipe between of the solenoid and the orifice. Feedback that confirms 100% gas flow based on temperature determined by the downstream thermocouple may be used.

Both the gas and liquid are forced through an orifice [122] in order to obtain the desired flow rate. During some, or preferably the entire, injection progress (gas-liquid-gas), pressure and temperature are measured and an equation is used to calculate the flow through the orifice, for example, to determine the amount of $CO_2$ injected, as described above. A temperature sensor [118] and a pressure sensor [120] act in-line ahead of (proximal to) the orifice and feed information into a calculating system, for example, a programmable logic controller, PLC [128]. Some or all of the mechanical valves can be controlled by a PLC and some or all of the sensors can be read by a PLC. The 2 solenoids [112 and 114] open and close (using the sequence described above) to control the flow rate and the average is measured and is used to calculate the amount of $CO_2$ dosed. A temperature sensor [124] measures the flow temperature immediately after the orifice [122] to determine if the $CO_2$ is in the liquid phase, gaseous phase or is a mixture of the two, recognizing that this has a major impact on the flow rate (e.g., at a certain pressure in the line and for a certain orifice, 25 SLPM gas vs. 1800 SLPM liquid). This post-orifice sensor is used to determine which phase (liquid or gas) is in the line and change the equation settings between liquid and gas, or mixed liquid and gas, to calculate the instantaneous flow rate. Integrating the flow over time allows the total flow to be calculated. The density of liquid is approximately 500 times greater than that of gas; therefore there is a drastic difference between the flow rate of 100% liquid and 100% gas. One or more pressure sensors (gauges) distal to the orifice may also be included (not shown), especially if the orifice opens into a conduit of sufficient length that the pressure immediately after the orifice is not atmospheric, so that calculations may be adjusted based on actual pressure distal to the orifice.

Further inputs and outputs can be used, as desired or suggested by the intended use of the system. For example, when used as a carbon dioxide delivery system for a concrete production facility, an operator can interact with the PLC of the carbon dioxide delivery system with a human machine interface (HMI) [132], which can be any suitable HMI, for example a touch screen. The operator can perform any suitable operation to send input to the delivery system PLC, for example by selecting a recipe using the HMI touch screen. The input could cause the delivery system PLC to issue the appropriate commands to, e.g., fill the headspace of a concrete mixer with carbon dioxide, then reduce the flow rate to take up the remaining mixing time to achieve the desired $CO_2$ dose. The carbon dioxide delivery cycle and the mixing cycle can be synchronized by using signals from the concrete facility's process PLC [134], which can be input to the delivery system PLC [128].

In certain embodiments, the carbon dioxide amount to be delivered is a predetermined amount and the carbon dioxide delivery system opens and closes the appropriate valves based on flow rate and time. In certain embodiments additional, or alternative, inputs are used to modify the flow of carbon dioxide, for example, based on inputs from the concrete mixing operation. Thus, for example, the system can use input from one or more sensors [136, 138, 140] to modify the flow rate and mix time. For example, these can be $CO_2$ sensors located at leak points outside the mixer that detect $CO_2$ concentration, and if the $CO_2$ concentration and/or rate of change of $CO_2$ concentration, passes a certain threshold or some other parameter, the flow of carbon dioxide is modulated, e.g., reduced or ceased. Such $CO_2$ sensors could be an important part of the dosing logic in a precast system, e.g., a masonry mixer injection system, but would likely mainly be present for safety in, e.g., ready-mix operations. It can alternatively or additionally include a mixer temperature sensor if the temperature of the concrete mixer can be used as feedback. It can alternatively or additionally include a concrete rheology measurement sensor. The sensors can shut the system off if the sensors measure a property that crosses a set threshold or other parameter. The system can also be run in manual mode and be set at a flow rate and then turned on for a given period of time. See U.S. patent application Ser. No. 14/249,308, filed Apr. 9, 2014, and PCT Application No. PCT/CA 2014050611, filed Jun. 25, 2014, for a further description of control systems that can be used with the apparatus and methods described herein.

Figure 4:
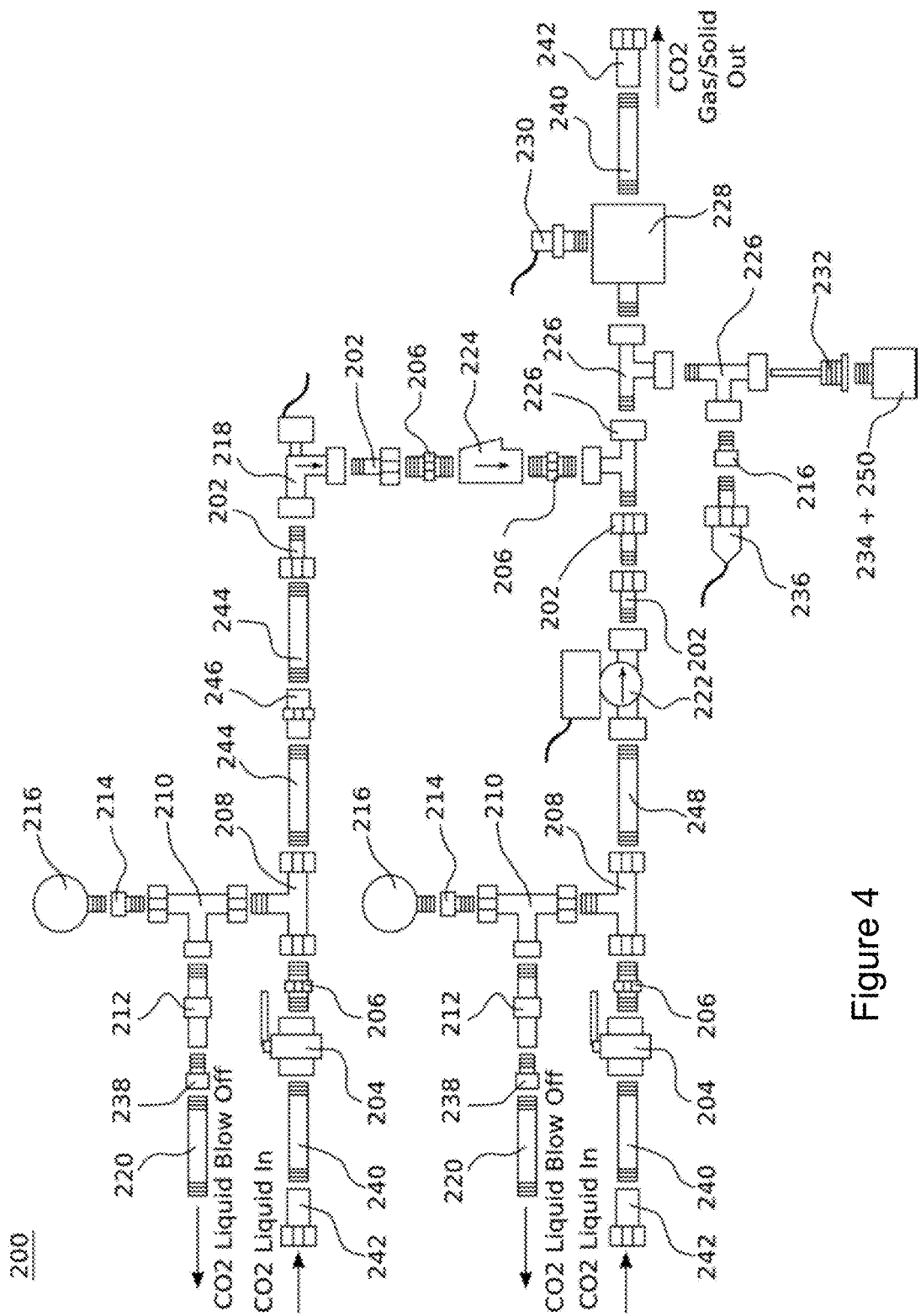
FIG. 4 shows a representation of one embodiment of a carbon dioxide delivery system.

One embodiment of an apparatus of the invention used in delivering carbon dioxide to concrete mixers to carbonate the concrete is shown in FIG. 4. In FIG. 4, 200=$CO_2$ Piping Assembly; 202=Fitting–½" MNPT×½" FNPT Swivel nipple; 204=Valve–½" FNPT Ball Valve; 206=Fitting–½" MNPT nipple; 208=Fitting–½" MNPT×½" 2FNPT Swivel tee; 210=Fitting–½" FNPT×½" 2FNPT Swivel tee; 212=Valve–½" MNPT Pressure Relief Valve (PRV) 400 psi; 214=Fitting–½" MPNT×¼" FNPT bushing; 216=Gauge–¼" MNPT Pressure Gauge (400 psi MAX); 218=Valve–½" FNPT Brass Solenoid Valve (high pressure rated); 220=Fitting–½" MNPT×4½ "nipple; 222=Valve–½" FNPT Stainless Steel Solenoid Valve (cryo liquid rated); 224=Valve–½" FNPT Check Valve; 226=Fitting–½" MNPT×½" 2FNPT Tee; 228=Nozzle–Stainless Steel Orifice; 230=Probe–¼" MNPT Thermocouple Probe; 232=Fitting–½" MNPT Thermowell; 234=Probe–½" MNPT Temperature Probe; 236=Transmitter–¼" MNPT Pressure Transmitter; 238=Fitting–½" FNPT×½" MNPT Pipe Adapter; 240=Fitting–½" MNPT×4" nipple; 242=Fitting–½" FNPT×½" FNPT Sw nipple; 244=Fitting–½" MNPT×3" nipple; 246=Fitting–½" FNPT coupling; 248=Nipple–½" MNPT×2½" nipple; and 250=Transmitter–Temperature Transmitter.

Carbonation of Concrete Mixes

In certain embodiments, the invention provides compositions and methods for carbonation of concrete mixes or components of concrete where the carbon dioxide is delivered as described herein and, optionally, the flow rate and total amount of carbon dioxide delivered to the mix is determined as described herein.

Cement mix operations are commonly performed to provide cement mixes (concrete) for use in a variety of applications, the most common of which is as a building material. Such operations include precast operations, in which a concrete structure is formed in a mold from the cement mix and undergoes some degree of hardening before transport and use at a location separate from the mix location, and ready mix operations, in which the concrete ingredients are supplied at one location and generally mixed in a transportable mixer, such as the drum of a ready mix truck, and transported to a second location, where the wet mix is used, typically by being poured or pumped into a temporary mold. Precast operations can be either a dry cast operation or a wet cast operation, whereas ready mix operations are wet cast. Any other operation in which a concrete mix is produced in a mixer and exposed to carbon dioxide during mixing is also subject to the methods and compositions of the invention. By "exposed to carbon dioxide" and similar phrases, as used herein, is meant exposure of the concrete mix to carbon dioxide at a concentration above that found in the atmosphere; usually at least 10-fold higher than atmospheric concentrations. Commercial sources of carbon dioxide of suitable purity are well-known. In certain embodiment, the carbon dioxide is 95-100% pure. The carbon dioxide may be commercially supplied high purity carbon dioxide. In this case, the commercial carbon dioxide may be sourced from a supplier that processes spent flue gasses or other waste carbon dioxide so that sequestering the carbon dioxide in the cement mix, e.g., hydraulic cement mix sequesters carbon dioxide that would otherwise be a greenhouse gas emission.

The methods in certain embodiments are characterized by contacting carbon dioxide with wet cement binder, e.g., hydraulic cement, in a mixer at any stage of the mixing, such as during mixing of the cement with water, or during the mixing of wetted cement with other materials, or both. The cement may be any cement, e.g., hydraulic cement capable of producing reaction products with carbon dioxide. For example, in certain embodiments the cement includes or is substantially all Portland cement, as that term is understood in the art. The cement may be combined in the mixer with other materials, such as aggregates, to form a cement-aggregate mixture, such as mortar or concrete. The carbon dioxide may be added before, during, or after the addition of the other materials besides the cement and the water. In addition or alternatively, in certain embodiments the water itself may be carbonated, i.e., contain dissolved carbon dioxide.

In certain embodiments, the carbon dioxide is contacted with the cement mix, e.g., hydraulic cement mix during mixing by contact with the surface of the mixing cement mix, e.g., hydraulic cement mix, that is, it is released from an opening or openings that is/are positioned so that the carbon dioxide is initially contacted over the surface of the concrete. As used herein, "contacted with the surface of the cement mix" and similar phrases encompasses embodiments in which the opening is close enough to the surface that there may be occasional contact with the surface of the mixing concrete and even temporary submersion under the surface, so long as the average distance of the opening from the surface is such that, on average, the carbon dioxide released is contacted with the surface and not underneath the surface.

Without being bound by theory, it is believed that the carbon dioxide contacted with the surface of the cement mix, e.g., hydraulic cement mix dissolves and/or reacts in the water, and is then subsumed beneath the surface by the mixing process, which then exposes different cement mix, e.g., cement mix, to be contacted, and that this process continues for as long as the wetted hydraulic cement is exposed to the carbon dioxide. It will be appreciated that the process of dissolution and/or reaction may continue after the flow of carbon dioxide is halted, since carbon dioxide will likely remain in the gas mixture in contact with the cement mix, e.g., hydraulic cement mix. In embodiments in which liquid carbon dioxide is used to produce gaseous and solid carbon dioxide, the solid carbon dioxide will sublimate and continue to deliver gaseous carbon dioxide to the cement mix, e.g., hydraulic cement mix after the flow of liquid carbon dioxide has ceased. This is particularly useful in ready mix truck operations, where there may be insufficient time at the batching facility to allow uptake of the desired amount of carbon dioxide; the use of liquid carbon dioxide which converts to gaseous and solid carbon dioxide allow more carbon dioxide to be delivered to the mix even after the truck leaves the batching facility. It will be appreciated that the dissolution of the carbon dioxide in the mix water, and its reaction with components of the concrete mix to produce reaction products, such as intermediates and final reaction products, will, in general, continue after mixing of the concrete materials and carbon dioxide has stopped, that is, will not be complete even after, e.g., the concrete mix is poured or otherwise used at a job site. In other words, mixing is halted before a chemical reaction between the carbon dioxide and the concrete materials is complete.

The carbon dioxide may be contacted with the cement mix, e.g., hydraulic cement mix such that it is present during mixing by any suitable system or apparatus. In certain embodiments, gaseous or liquid carbon dioxide is supplied via one or more conduits that contain one or more openings positioned to supply the carbon dioxide to the surface of the mixing cement mix, e.g., hydraulic cement mix. The conduit and opening may be as simple as a tube, e.g., a flexible tube with an open end. The conduit may be sufficiently flexible so as to allow for movement of various components of the cement mix, e.g., hydraulic cement mixing apparatus, the conduit opening, and the like, and/or sufficiently flexible to be added to an existing system as a retrofit. On the other hand, the conduit may be sufficiently rigid, or tied-off, or both, to insure that it does not interfere with any moving part of the cement mix, e.g., hydraulic cement mixing apparatus. In certain embodiments, part of the conduit can be used for supplying other ingredients to the cement mix, e.g., water, and configured such that either the other ingredient or carbon dioxide flows through the conduit, e.g., by means of a T-junction.

Carbon dioxide may also be delivered to the cement mix, e.g., hydraulic cement mix as part of the mix water, i.e., dissolved in some or all of the mix water. Methods of charging water with carbon dioxide are well-known, such as the use of technology available in the soda industry. Some or all of the carbon dioxide to be used may be delivered this way. The mix water may be charged to any desired concentration of carbon dioxide achievable with the available technology, such as at least 1, 2, 4, 6, 8, 10, 12, 14, or 16 g of carbon dioxide/L of water, and/or not more than 2, 4, 6, 8, 10, 12, 14, 18, 20, 22, or 24 g of carbon dioxide/L of water, for example 1-12, 2-12, 1-10, 2-10, 4-12, 4-10, 6-12, 6-10, 8-12, or 8-10 g of carbon dioxide/L of water. It will be appreciated that the amount of carbon dioxide dissolved in the mix water is a function of the pressure of the carbon dioxide and the temperature of the mix water; at lower temperatures, far more carbon dioxide can be dissolved than at higher temperatures. Without being bound by theory, it is thought that the mix water so charged contacts the cement mix, e.g., hydraulic cement mix and the carbon dioxide contained therein reacts very quickly with components of the cement mix, e.g., hydraulic cement mix, leaving the water available to dissolve additional carbon dioxide that may be added to the system, e.g., in gaseous form.

In certain embodiments, a cement mix such as a concrete mix is carbonated with carbon dioxide supplied as carbonated water, for example, in the drum of a ready mix truck. The carbonated water serves as a portion of the total mix water for the particular mix. The carbonated water can provide at least 1, 5, 10, 15, 20, 25, 30, 35, 40, 50, 60, 70, 80, or 90% of the total mix water, and/or no more than 10, 20, 30, 40, 50, 60, 70, 80, 90, 95, or 100% of the mix water. The carbonated water may be added at the start of mixing of the cement mix, or it may be added after the start of mixing. It can be added as one batch or in stages, for example, as 2, 3, 4, 5 or more than 5 batches. The batches may be equal in volume or different volumes, and have the same carbonation or different carbonations. In certain embodiments, the carbonated water is less than 100% of the total mix water, for example, less than 80%, or less than 70%, or less than 60%, or less than 50%. In certain of these embodiments, embodiments, non-carbonated water is first added to the mix, and the cement mix, e.g., concrete, is allowed to mix for a certain period before carbonated water is added, for example, for at least 5, 10, 15, 20, 30, 40, or 50 seconds, or at least 1, 2, 5, 10, 15, 20, 25, 30, 40, 50, or 60 minutes before addition of the carbonated water, and/or not more than 10, 15, 20, 30, 40, or 50 seconds, or 1, 2, 5, 10, 15, 20, 25, 30, 40, 50, 60, 90, 120, 240, or 360 minutes before addition of carbonated water. The carbonated water may contribute all of the carbon dioxide used to carbonate a cement mix, e.g., concrete (neglecting atmospheric carbon dioxide); this is especially true for low-dose carbonation, for example, carbonation with a dose of carbon dioxide of less than 1.5% bwc, or less than 1.0% bwc, or less than 0.8% bwc. The carbonated water may contribute part of the carbon dioxide used to carbonate a cement mix, e.g., concrete, such as not more than 10, 20, 30, 40, 50, 60, 70, 80, 90 or 95% of the carbon dioxide and/or at least 5, 10, 20, 30, 40, 50, 60, 70, 80, or 90% of the carbon dioxide. In certain embodiments, the remaining carbon dioxide is supplied as a gas. In certain embodiments, the remaining carbon dioxide is supplied as a solid. In certain embodiments, the remaining carbon dioxide is supplied as a mixture of a gas and a solid, for example, carbon dioxide delivered to an orifice directed into the mixer in liquid form, which becomes gas and solid when passing through the orifice. The exact mix of carbonated water and other carbon dioxide source will be determined based on the dose of carbon dioxide to be delivered and other factors, such as delivery time, temperature (lower temperatures allow greater carbon dioxide delivery via carbonated water), and the like. The carbonated water may be produced by any suitable method, as described herein, and may be delivered to the mixer, e.g., the ready mix truck, via the normal water line or via a dedicated line. In certain embodiments carbonated water is delivered to the mix at the batch site and/or during transportation, and an optional dose is delivered at the job site, depending on the characteristics of the mix measured at the job site. The use of carbonated water can allow for very high efficiencies of carbon dioxide uptake, as well as precise control of dosage, so that highly efficient and reproducible carbon dioxide dosing can be achieved. In certain embodiments in which carbonated mix water is used, the efficiency of carbonation can be greater than 60, 70, 80, 90, or even 95%, even when operating in mixers, such as ready mix drums, which are open to the atmosphere.

Carbon dioxide may be introduced to the mixer such that it contacts the hydraulic cement mix (concrete) before, during, or after addition of water, or any combination thereof, so long as it is present during some portion of the mixing of some or all of the cement mix, e.g., hydraulic cement mix. In certain embodiments, the carbon dioxide is introduced during a certain stage or stages of mixing. In certain embodiments, the carbon dioxide is introduced to a cement mix, e.g., hydraulic cement mix during mixing at one stage only. In certain embodiments, the carbon dioxide is introduced during one stage of water addition, followed by a second stage of water addition. In certain embodiments, the carbon dioxide is introduced to one portion of cement mix, e.g., hydraulic cement mix, followed by addition of one or more additional portions of cement mix, e.g., hydraulic cement mix.

In certain embodiments, carbon dioxide is delivered to a flowable concrete mix, for example, in a mixer, e.g., while the concrete mix is mixing, where the amount of carbon delivered to the concrete mix is determined from parameters including pressure and temperature measurements of the carbon dioxide as it is delivered to the concrete mix. The carbon dioxide can be delivered, at least in part, as a mixture of gaseous and solid carbon dioxide produced by exposing liquid carbon dioxide to a pressure drop sufficient to induce formation of gaseous and solid carbon dioxide, for example, by passing liquid carbon dioxide through an orifice whose downstream, or distal, end is at atmospheric pressure; a first temperature measurement and a pressure measurement can be taken of the liquid carbon dioxide on the upstream, or proximal, side of the orifice and a second temperature measurement can be taken of carbon dioxide exiting the orifice, i.e., on the downstream or distal side of the orifice. Apparatus and methods for delivery of the carbon dioxide, determining the temperatures and pressure, and determining flow rates and/or amounts of carbon dioxide are as described herein. In these embodiments, it is not necessary to use other methods of determining flow and/or total amount of carbon dioxide delivered, such as mass flow controllers and/or weights or masses of carbon dioxide containers.

In certain embodiments, a predetermined amount of carbon dioxide is added to the concrete mix, and the flow of carbon dioxide is halted when the amount of carbon dioxide delivered to the mix equals or exceeds the predetermined amount. In certain embodiments, one or more additional characteristics of the concrete mix or its environment are measured and carbon dioxide delivery can be modulated based on the amount of carbon dioxide delivered in combination with the one or more additional characteristics. The concrete mix can be a wet mix, such as used in ready-mix applications and certain wet mix precast operations, or a dry mix, such as used in certain dry mix precast operations. The mixer for the concrete mix can be a stationary mixer, such as a mixer in a precast concrete operation, or a transportable mixer, such as a drum of a ready-mix truck.

The predetermined dose of carbon dioxide may be any suitable dose, generally expressed as a % by weight cement (bwc). In certain embodiments, the dose or amount of carbon dioxide of carbon dioxide that is determined by the methods and compositions of the invention is 0.01-5% bwc, for example, 0.05-4% bwc, in some cases 0.05-2% bwc. In certain embodiments, a low dose of carbon dioxide is delivered, e.g., an amount less than or equal to 2% bwc, or 1.5% bwc, or 1% bwc. In certain embodiments, the predetermined amount of carbon dioxide to be delivered to the concrete mix may be not more than 1.5%, 1.2%, 1%, 0.8%, 0.7%, 0.6%, 0.5%, 0.4%, 0.3%, 0.2%, 0.1%, or 0.05% bwc and/or at least 0.01, 0.05, 0.1, 0.2, 0.3, 0.4, 0.5, 0.6, 0.7, 0.8, 0.9, 1.0, or 1.2% bwc, such as a dose of 0.01-1.5%, 0.01-1.2%, 0.01-1%, 0.01-0.8%, 0.01-0.6%, 0.01-0.5%, 0.01-0.4%, 0.01-0.3%, 0.01-0.2%, or 0.01-0.1% bwc, or a dose of 0.02-1.5%, 0.02-1.2%, 0.02-1%, 0.02-0.8%, 0.02-0.6%, 0.02-0.5%, 0.02-0.4%, 0.02-0.3%, 0.02-0.2%, or 0.02-0.1% bwc, or a dose of 0.04-1.5%, 0.04-1.2%, 0.04-1%, 0.04-0.8%, 0.04-0.6%, 0.04-0.5%, 0.04-0.4%, 0.04-0.3%, 0.04-0.2%, or 0.04-0.1% bwc, or a dose of 0.06-1.5%, 0.06-1.2%, 0.06-1%, 0.06-0.8%, 0.06-0.6%, 0.06-0.5%, 0.06-0.4%, 0.06-0.3%, 0.06-0.2%, or 0.06-0.1% bwc, or a dose of 0.1-1.5%, 0.1-1.2%, 0.1-1%, 0.1-0.8%, 0.1-0.6%, 0.1-0.5%, 0.1-0.4%, 0.1-0.3%, or 0.1-0.2% bwc. Any other suitable dose, such as those described throughout U.S. Patent Publication No. 20140373755, or PCT Publication No. WO2014205577, may also be used.

The carbon dioxide, e.g., gaseous carbon dioxide or liquid carbon dioxide, is introduced in the mixing cement mix, e.g., hydraulic cement mix, for example, in the first stage of mixing, at a certain flow rate and for a certain duration in order to achieve a total carbon dioxide exposure. The flow rate and duration will depend on, e.g., the purity of the carbon dioxide gas, the total batch size for the cement mix, e.g., hydraulic cement mix and the desired level of carbonation of the mix. A metering system and adjustable valve or valves in the one or more conduits may be used to monitor and adjust flow rates. In some cases, the duration of carbon dioxide flow to provide exposure is at or below a maximum time, such as at or below 100, 50, 20, 15, 10, 8, 5, 4, 3, 2, or one minute. In certain embodiments, the duration of carbon dioxide flow is less than or equal to 5 minutes. In certain embodiments, the duration of carbon dioxide flow is less than or equal to 4 minutes. In certain embodiments, the duration of carbon dioxide flow is less than or equal to 3 minutes. In certain embodiments, the duration of carbon dioxide flow is less than or equal to 2 minutes. In certain embodiments, the duration of carbon dioxide flow is less than or equal to 1 minutes. In some cases, the duration of carbon dioxide flow to provide exposure is within a range of times, such as 0.5-20 min, or 0.5-15 min, or 0.5-10 min, or 0.5-8 min, or 0.5-5 min, or 0.5-4 min, or 0.5-3 min, or 0.5-2 min, or 0.5-1 min, or 1-20 min, or 1-15 min, or 1-10 min, or 1-8 min, or 1-5 min, or 1-4 min, or 1-3 min, or 1-2 min. In certain embodiments, the duration of carbon dioxide flow is 0.5-5 min. In certain embodiments, the duration of carbon dioxide flow is 0.5-4 min. In certain embodiments, the duration of carbon dioxide flow is 0.5-3 min. In certain embodiments, the duration of carbon dioxide flow is 1-5 min. In certain embodiments, the duration of carbon dioxide flow is 1-4 min. In certain embodiments, the duration of carbon dioxide flow is 1-3 min. In certain embodiments, the duration of carbon dioxide flow is 1-2 min.

In low dose carbonation, as in all cement mix, e.g., concrete, carbonation, various factors may be manipulated to produce optimal or desired results. These include one or more of: time after beginning of mixing at which carbon dioxide is applied; number of doses of carbon dioxide; rate at which carbon dioxide is supplied to the mixing chamber; form of the carbon dioxide (gas, solid, and/or dissolved in water); and the like. Mixing is said to have commenced upon addition of the first aliquot of water to the cement-containing mix. It will be appreciated that in certain instances, components of a concrete mix, e.g., aggregate, may be wet and that "the first mix water" may be the water on the aggregate. Carbon dioxide can be supplied to a mix before the first addition of water, for example by flooding a chamber or head space with carbon dioxide before water addition, but in this case the application of carbon dioxide is considered to occur when the first water is added, since virtually no reaction will occur until the carbon dioxide dissolves in the mix water. Thus, in certain embodiments, carbon dioxide is applied to the mix at 0 minutes, that is, carbon dioxide is present to the mix chamber when the first mix water is supplied, or supplying carbon dioxide to the mix chamber commences when the first mix water is applied, or both. In certain embodiments, carbon dioxide is applied at least 1, 2, 5, 10, 15, 20, 30, 40, 50, 60, 70, 80, or 90 minutes after mixing commences, and/or not more than 2, 5, 10, 15, 20, 30, 40, 50, 60, 70, 80, 90, 120, or 180 minutes after mixing commences. For example, in the case of carbon dioxide supplied to a concrete mix in a ready mix truck, the mix components, including at least part of the mix water, may be added to the truck, and it may be desirable that carbon dioxide addition not commence until at least 2, 3 or 4 minutes or more after mixing has commenced. Such addition could occur, e.g., at a wash station, where the driver stops to wash the truck before commencing delivery; the truck is usually stopped at the wash station for at least 5-10 minutes, and an on-site carbon dioxide delivery system can be used to supply carbon dioxide to the drum of the truck during the wash station stop. Part or all of the dose of carbon dioxide can be delivered in this manner, for example by delivering carbon dioxide to the truck through the water line (though any suitable means may be used); in embodiments where a carbon dioxide source is attached to the truck there may be some mechanism to remind the driver to detach it before departing, such as an alarm. Alternatively, or additionally, the desirable time for addition of carbon dioxide to the mix may be later in the mix time, such as at a time that the truck is normally en route to the job site, or at the job site. In this case, a portable source of carbon dioxide may be attached to the truck, with suitable valving and tubing, so as to deliver one or more doses of carbon dioxide to the drum of the truck at a later time, such as at least 15, 30, or 60 minutes after mixing commences. A controller, which may be self-contained or may be remotely activated and which may send signals to a remote site regarding dosing and other information, may be included in the system so that dosing commences at a predetermined time after mixing commences and continues for a predetermined time, or continues until some predetermined characteristic or characteristics of the concrete mix is detected. Alternatively, the time and/or duration of dosing may be manually controlled, or subject to manual override. The carbon dioxide source can be as simple as a pressurized tank of gaseous carbon dioxide, which can be topped off periodically, for example when the truck returns to the batching site, to ensure a sufficient supply of carbon dioxide for any ensuing round of carbonation, e.g., without the need to ascertain carbon dioxide levels in the tank. In these embodiments, some or all of the carbonation may occur at the job site, for example, based on determination of one or more characteristics of the concrete.

The rate of delivery of the carbon dioxide may be any desired rate and the rate may be controlled by any suitable means. A slower rate of delivery may be desired, especially in wet mix operations such as ready mix operations, where the higher w/c ratio is known to slow carbonation compared to lower w/c operations, e.g., some precast operations. Thus, although a single dose may be used, in some cases the total dose of carbon dioxide is divided into two or more smaller doses. Thus, the carbon dioxide may be delivered as a single dose, or as multiple doses, for example, as at least 2, 3, 4, 5, 6, 7, 8, 9, or 10 doses, and/or not more than 3, 4, 5, 6, 7, 8, 9, 10, 12, 15, or 20 doses; such as 2-10 doses, or 2-5 doses. Each dose may be equal in size to the others or different, and the interval between doses may be timed equally or not, as desired. The exact number and size of the doses may be predetermined, or it may be dictated by one or more characteristics of the mix that are monitored. The carbon dioxide may be in any suitable form, such as gas, or a gas/solid mix. Any other suitable division of doses, such as those described throughout U.S. Patent Publication No. 20140373755, or PCT Publication No. WO2014205577 may also be used.

The dose chosen for a given mix, for example, to produce a desired increase in early strength or set, or to produce an optimal increase in early strength or set, can be dependent on the mix and especially on the cement used in the mix. In certain embodiments the invention provides a method of carbonating a cement mix, e.g., concrete, during mixing, where carbon dioxide is added to the mix at a predetermined dose, where the predetermined dose is determined by testing one or more components of the mix, for example, the concrete, to determine a dose or a range of doses that produces optimal or desired increase in early strength and/or set. It will be appreciated that, in the case of low dose carbonation, a carbonation value may not be able to be determined, and that strength tests can require multiple samples and days to weeks to complete. Thus in some embodiments, a predetermined dose of carbon dioxide is determined using an alternative marker, such as isothermal calorimetry. Heat release during hydration is related to two somewhat overlapping peaks. The main heat release is related to the hydration of silicates, while a second heat release, observed as a hump on the downslope of the silicate peak, is associated with the hydration of the aluminates. Isothermal calorimetry testing is easy to carry out in mortar or even cement paste with very minimal sample preparation compared to the making of concrete samples, thus allowing for a rapid and convenient method of determining an optimal $CO_2$ dose and timing for a given cement, by testing a range of doses and delivery times. The results obtained are either in the form of heat flow rate over time (also referred to as power vs. time herein), which describes the rate of cement hydration, or in the form of heat of hydration over time, which is the integrated heat flow rate (also referred to as energy vs. time herein).

The methods and compositions of the invention allow for very high levels of efficiency of uptake of carbon dioxide into the mixing concrete, where the efficiency of uptake is the ratio of carbon dioxide that remains in the mixing concrete as stable reaction products to the total amount of carbon dioxide to which the mixing concrete is exposed. In certain embodiments, the efficiency of carbon dioxide uptake, for example, in ready mix trucks at full capacity during a period of operation at a batching plant, such as averaged over all trucks receiving carbon dioxide in a single day, is at least 40, 50, 60, 70, 80, 90, 95, 96, 97, 98, 99, or 99%, or 40-100, 50-100, 60-100, 70-100, 80-100, 90-100, 40-99, 50-99, 60-99, 70-99, 80-99, or 90-99%. This is especially true in open mixers, e.g., the drum of a ready mix truck; such efficiencies may be achieved by the positioning of the conduit to deliver carbon to the mixing concrete in the drum of the truck, other characteristics of the methods and compositions of the invention described herein, or a combination thereof.

Part of an apparatus of the invention can be, for example a first controller, e.g., a first PLC, that controls the carbon dioxide delivery, which may receive one or more signals from the mix operation and/or one or more signals from a second controller, for example a second PLC, for the mix system, or both, that indicates a change in an aspect of the mix operation is occurring. The signal or signals may be used, e.g., to time the initiation of carbon dioxide delivery. In embodiments in which a predetermined amount of carbon dioxide is to be delivered, the amount of carbon dioxide delivered is then determined from the time that delivery starts from parameters including, e.g., pressure and temperature measurements for the carbon dioxide as described herein, and is halted when the predetermined amount is reached.

For example, in a stationary mixer system, the first controller may receive a signal from the proximity switch or the customer PLC indicating cement gate opening. This signal may be used to time the initiation of carbon dioxide delivery. In embodiments where a predetermined amount of carbon dioxide is to be added to the concrete mix, flow rate and total amount of carbon dioxide delivered can be determined as described herein, until the predetermined amount of carbon dioxide is reached and the first controller causes carbon dioxide delivery to cease.

An alternative method may be used, for example, when a predetermined amount of carbon dioxide is to be delivered to a transportable mixer, such as the drum of a ready-mix truck. Instead of getting a signal from the proximity switch or the customer PLC indicating cement gate opening, the first controller, e.g., PLC, receives a signal, e.g., a 120 VAC signal, from the ready-mix batching system indicating that carbon dioxide delivery to the drum of the truck is to be initiated. The signal is continuous as long as carbon dioxide delivery is to continue, and carbon dioxide delivery stops when the signal is lost.

The first controller determines flow rate and amount carbon dioxide delivered, and outputs a signal, e.g., a 24 VDC pulse for every incremental amount of $CO_2$ delivered, for example, for every x kg of $CO_2$ delivered to a drum of a ready-mix truck. The ready-mix batching system counts the number of pulses and stops the 120 VAC signal once it reaches the desired number of pulses that corresponds to the desired dose of $CO_2$, thus ending $CO_2$ delivery to the truck. The result is that the system can deliver, e.g., full liquid at maximum flow to the orifice without having to turn the valve off and on. During the operation of the liquid system the gas and liquid valves can be opened and closed to maintain a set average flow rate over a given amount of time. In this case, once the liquid valve is opened, it remains open until the desired dose (mass) has been achieved, then shuts off using the normal valve sequence as outlined herein. This procedure simplifies carbon dioxide delivery because flow is determined by the equations above, with just a few measurements needed. There is also no need for recipes in the first controller, since dosing information can be drawn from the ready-mix batching system controller, e.g., PLC. A light may be added that illuminates when carbon dioxide delivery is occurring. One or more sensors in the vicinity of the drum can be used to monitor carbon dioxide concentrations for safety purposes and carbon dioxide delivery can be halted if a threshold is exceeded; an alarm can also be delivered, such as an alarm sound, or light, or both.

The dosing may be started at any suitable time before, during, or after the mixing of the concrete begins, that is, after water is added so that the cement in the concrete mix begins hydration, for example, immediately upon addition of water, or after at least 10, 20, 30, 40, or 50 seconds, or at least 1, 2, 3, 4, 5, 6, 7, 8, 9, 10, 12, 15, or 20 minutes after addition of water.

One or more admixtures may also be added to the concrete mix, before, during, and/or after the addition of the carbon dioxide. In certain cases, the addition of carbon dioxide alters the properties of the concrete mix in such a manner that it is desirable to add an admixture to the mix to counteract the effect of the carbon dioxide; for example, in certain cases, addition of carbon dioxide can reduce the flowability of the concrete mix and it is desirable to add an admixture that returns flowability to a desired level. In certain embodiments, one or more admixtures, described more fully below, are added at a time and in a concentration so that flowability of the final concrete mix is within 50, 40, 30, 20 15, 10, 8, 5, 4, 3, 2, or 1% of the flowability that would be achieved without the addition of carbon dioxide, or of a predetermined flowability. In certain embodiments, one or more admixtures, described more fully below, are added at a time and in a concentration so that flowability of the final concrete mix is within 20% of the flowability that would be achieved without the addition of carbon dioxide, or a predetermined flowability. In certain embodiments, one or more admixtures, described more fully below, are added at a time and in a concentration so that flowability of the final concrete mix is within 10% of the flowability that would be achieved without the addition of carbon dioxide, or a predetermined flowability. In certain embodiments, one or more admixtures, described more fully below, are added at a time and in a concentration so that flowability of the final concrete mix is within 5% of the flowability that would be achieved without the addition of carbon dioxide, or a predetermined flowability. In certain embodiments, one or more admixtures, described more fully below, are added at a time and in a concentration so that flowability of the final concrete mix is within 2% of the flowability that would be achieved without the addition of carbon dioxide, or a predetermined flowability. In certain embodiments, one or more admixtures, described more fully below, are added at a time and in a concentration so that flowability of the final concrete mix is within 1-50%, or 1-20%, or 1-10%, or 1-5%, or 2-50%, or 2-20%, or 2-10%, or 2-5% of the flowability that would be achieved without the addition of carbon dioxide, or a predetermined flowability. Any suitable measurement method for determining flowability may be used, such as the well-known slump test.

If one or more admixtures is used, any suitable admixture may be used, such as those described in U.S. Patent Publication No. 20140373755, or PCT Publication No. WO2014205577. In particular, useful admixtures include set retarders. Set retarders include carbohydrates, i.e., saccharides, such as sugars, e.g., fructose, glucose, and sucrose, and sugar acids/bases and their salts, such as sodium gluconate and sodium glucoheptonate; phosphonates, such as nitrilotri(methylphosphonic acid), 2-phosphonobutane-1,2, 4-tricarboxylic acid; and chelating agents, such as EDTA, Citric Acid, and nitrilotriacetic acid. Other saccharides and saccharide-containing admixes of use in the invention include molasses and corn syrup. In certain embodiments, the admixture is sodium gluconate. Other exemplary admixtures that can be of use as set retarders include sodium sulfate, citric acid, BASF Pozzolith XR, firmed silica, colloidal silica, hydroxyethyl cellulose, hydroxypropyl cellulose, fly ash (as defined in ASTM C618), mineral oils (such as light naphthenic), hectorite clay, polyoxyalkylenes, natural gums, or mixtures thereof, polycarboxylate superplasticizers, naphthalene HRWR (high range water reducer).

Additional set retarders that can be used include, but are not limited to an oxy-boron compound, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide. Illustrative examples of retarders are set forth in U.S. Pat. Nos. 5,427,617 and 5,203,919. The admixture or admixtures may be added to any suitable final percentage (bwc), in some cases, the concentration is greater than 0.01%, 0.015%, 0.02%, 0.025%, 0.03%, 0.035%, 0.04%, 0.05%, 0.06%, 0.07%, 0.08%, 0.09%, 0.1%, 0.15%, 0.2%, 0.3%, 0.4%, or 0.5% bwc. The concentration may also be less than 2, 1.5, 1, 0.9, 0.8, 0.7, 0.6, 0.5, 0.4, 0.3, 0.2, or 0.1%. For example, a suitable range of dose, bwc, may be used, such as in the range of 0.01-0.5%, or 0.01-0.3%, or 0.01-0.2%, or 0.01-0.1%, or 0.01-1.0%, or 0.01-0.05%, or 0.05% to 5%, or 0.05% to 1%, or 0.05% to 0.5%, or 0.1% to 1%, or 0.1% to 0.8%, or 0.1% to 0.7% per weight of cement. The admixture may be added to a final percentage of greater than 0.01, 0.02, 0.03, 0.04, 0.05, 0.06, 0.07, 0.08, 0.09, 0.1, 0.15, 0.2, 0.3, 0.4, or 0.5%; in certain cases also less than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, or 0.02%. For example, in certain embodiments, sodium gluconate is used as an admixture at a dose of between 0.01 and 1% bwc, or between 0.01 and 0.8%, or between 0.01 and 0.5%, or between 0.01 and 0.4% bwc, or between 0.01 and 0.3%, or between 0.01 and 0.2% bwc, or between 0.01 and 0.1%, or between 0.01 and 0.05%, or between 0.03 and 1% bwc, or between 0.03 and 0.8%, or between 0.03 and 0.5%, or between 0.03 and 0.4% bwc, or between 0.03 and 0.3%, or between 0.03 and 0.2% bwc, or between 0.03 and 0.1%, or between 0.03 and 0.08%, or between 0.05 and 1% bwc, or between 0.05 and 0.8%, or between 0.05 and 0.5%, or between 0.05 and 0.4% bwc, or between 0.05 and 0.3%, or between 0.05 and 0.2% bwc, or between 0.05 and 0.1%, or between 0.05 and 0.08%, or between 0.1 and 1% bwc, or between 0.1 and 0.8%, or between 0.1 and 0.5%, or between 0.1 and 0.4% bwc, or between 0.1 and 0.3%, or between 0.1 and 0.2% bwc. The sodium gluconate may be added before, during, or after carbonation of the mix, or any combination thereof, and may be added as one, two, three, four, or more than four divided doses. The carbohydrate or derivative may be added in two or more doses, such as one dose before carbonation and one dose during and/or after carbonation. In certain embodiments, calcium stearate is used as an admixture.

In certain embodiments, a second admixture is also used, such as any of the admixtures described in U.S. Patent Publication No. 20140373755, or PCT Publication No. WO2014205577. In certain embodiments, the second admixture is a strength accelerator. In certain embodiments, a third admixture is also used, such as any of the admixtures described in U.S. Patent Publication No. 20140373755, or PCT Publication No. WO2014205577. In certain embodiments, a fourth admixture is also used, such as any of the admixtures described in U.S. Patent Publication No. 20140373755, or PCT Publication No. WO2014205577. See, e.g., paragraphs 88-105, 183, Table 1, and Examples and Figures of U.S. Patent Publication No. 20140373755.

In certain embodiments, one or more supplementary cementitious materials (SCMs) and/or cement replacements are added to the mix at the appropriate stage for the particular SCM or cement replacement. In certain embodiments, an SCM is used. Any suitable SCM or cement replacement may be used; exemplary SCMs include blast furnace slag, fly ash, silica fume, natural pozzolans (such as metakaolin, calcined shale, calcined clay, volcanic glass, zeolitic trass or tuffs, rice husk ash, diatomaceous earth, and calcined shale), and waste glass. Further cement replacements include interground limestone, recycled/waste plastic, scrap tires, municipal solid waste ash, wood ash, cement kiln dust, foundry sand, and the like. In certain embodiments, an SCM and/or cement replacement is added to the mix in an amount to provide 0.1-50%, or 1-50%, or 5-50%, or 10-50%, or 20-50%, or 1-40%, or 5-40%, or 10-50%, or 20-40% bwc. In certain embodiments, an SCM is used and the SCM is fly ash, slag, silica fume, or a naturual pozzolan. In certain embodiment, the SCM is fly ash. In certain embodiments, the SCM is slag.

It is well-known that addition of an SCM such as fly ash or slag to a cement mix, e.g., concrete mix, can retard early strength development; indeed, when weather becomes cold enough, the use of SCM in mixes is curtailed because the early strength development is sufficiently retarded as to make the use of the mix problematic. In addition, the maximum amount of SCM that may be added to a mix can be limited by its effect on early strength development. The present inventors have found that even very low doses of carbon dioxide, when added to a concrete mix containing SCM, can accelerate early strength development and thus could allow such mixes to be used under circumstances where they otherwise might not be used, e.g., in cold weather, or in greater amounts, thus extending the usefulness of such mixes, such as extending the useful season for such mixes, or increasing the proportion of SCM in a given mix, or both.

In certain embodiments the invention provides methods and compositions for the expanding the range of conditions under which an SCM may be used in a concrete mix by carbonating the mix. The range of conditions may include the temperature at which the SCM-containing mix may be used, or the amount of SCM that may be added while maintaining adequate early strength development, or the early strength for a given amount of SCM in a mix.

In certain embodiments, the invention provides a method for decreasing the minimum temperature at which an SCM-concrete mix may be used, thus increasing the overall acceptable temperature range for the SCM-concrete mix, by exposing the SCM-concrete mix to a dose of carbon dioxide sufficient to modulate, e.g., accelerate, early strength development and/or set of the mix to a level at which the mix may be used at a temperature below that at which it could have been used without the carbon dioxide exposure. The dose can be such that the early strength development of the mix allows its use in a desired manner at a temperature that is at least 1, 2, 3, 4, 5, 6, 8, 9, or 10° C. below the temperature at which it could be used without the carbon dioxide treatment and/or not more than 2, 3, 4, 5, 6, 8, 9, 10, or 12° C. below the temperature at which it could be used without the carbon dioxide treatment. The dose of carbon dioxide added to the mix to achieve the desired increase in early strength development can be not more than 2.0, 1.5, 1.2, 1.0, 0.9, 0.8, 0.7, 0.6, 0.5, 0.4, 0.3, 0.2, 0.1, or 0.05% carbon dioxide bwc. The dose can be such that the early strength development of the mix, e.g., the strength at 8, 12, 16, 20, or 24 hours, or any other suitable time point for early strength development, is, on average, at least 1, 2, 5, 7, 10, 12, 15, 20, or 25% greater than the strength without the carbon dioxide dose, and is sufficient for the use for which the mix is intended. In certain embodiments, an alternative or additional marker other than early strength development, such as a value from calorimetry as described elsewhere herein, may be used instead of or in addition to early strength measurements, for example, to determine the desired or optimal dose of carbon dioxide and/or dosing conditions. The carbon dioxide may be delivered as a single dose or multiple doses, and at any suitable rate or in any suitable form, as described elsewhere herein. The SCM can be any suitable SCM. In certain embodiments, the SCM is fly ash. In certain embodiments, the SCM is slag. In certain embodiments, the SCM-concrete mix is delivered to a job site in a ready mix truck, and the carbon dioxide is applied to the mix at the batching site, en route to the job site, or at the job site, or any combination thereof. In certain embodiments, the carbon dioxide is gaseous carbon dioxide. In certain embodiments, the carbon dioxide is dissolved in mix water. In certain embodiments, the carbon dioxide is solid carbon dioxide. In certain embodiments, a combination of gaseous carbon dioxide and carbon dioxide dissolved in mix water is used.

In certain embodiments, the invention provides a method for increasing the maximum amount (proportion) of SCM that may be used in an SCM-concrete mix, thus increasing the overall acceptable range of amounts (proportions) of SCM for the SCM-concrete mix, by exposing an SCM-concrete mix that contains a proportion of SCM that would normally be higher than the acceptable proportion due to effects on early strength development, to a dose of carbon dioxide sufficient to modulate, e.g., accelerate, early strength development of the mix to a level at which the mix may be used for its normal purposes. In certain embodiments, the maximum acceptable proportion of SCM in the mix is increased by carbonation by at least 0.5, 1, 1.5, 2, 2.5, 3, 3.5, 4, 5, 6, 7, 8, 9, 10, 11, 12, 13, 14, 15, 16, 17, 18, 19, or 20% bwc and/or not more than 1, 1.5, 2, 2.5, 3, 3.5, 4, 5, 6, 7, 8, 9, 10, 11, 12, 13, 14, 15, 16, 17, 18, 19, 20, or 25% bwc, over the maximum acceptable proportion of SCM without carbonation. The dose of carbon dioxide to the mix can be not more than 2.0, 1.5, 1.2, 1.0, 0.9, 0.8, 0.7, 0.6, 0.5, 0.4, 0.3, 0.2, 0.1, or 0.05% carbon dioxide bwc, and/or not less than 2.5, 2.0, 1.5, 1.2, 1.0, 0.9, 0.8, 0.7, 0.6, 0.5, 0.4, 0.3, 0.2, or 0.1% carbon dioxide bwc. The SCM can comprises at least 1, 2, 3, 4, 5, 6, 7, 8, 9, 10, 12, 15, 20, or 30% of the mix, and/or not less than 2, 3, 4, 5, 6, 7, 8, 9, 10, 12, 15, 20, 30, 40, or 50% of the mix. The dose can be such that the early strength development of the mix, e.g., the strength at 8, 12, 16, 20, or 24 hours, or any other suitable time point for early strength development, is, on average, at least 1, 2, 5, 7, 10, 12, 15, 20, or 25% greater than the strength without the carbon dioxide dose. In certain embodiments, an alternative or additional marker other than early strength development, such as a value from calorimetry as described elsewhere herein, may be used instead of or in addition to early strength measurements, for example, to determine the desired or optimal dose of carbon dioxide and/or dosing conditions. The carbon dioxide may be delivered as a single dose or multiple doses, and at any suitable rate or in any suitable form, as described elsewhere herein. The SCM can be any suitable SCM. In certain embodiments, the SCM is fly ash. In certain embodiments, the SCM is slag. In certain embodiments, the SCM-concrete mix is delivered to a job site in a ready mix truck, and the carbon dioxide is applied to the mix at the batching site, en route to the job site, or at the job site, or any combination thereof. In certain embodiments, the carbon dioxide is gaseous carbon dioxide. In certain embodiments, the carbon dioxide is dissolved in mix water. In certain embodiments, the carbon dioxide is solid carbon dioxide. In certain embodiments, a combination of gaseous carbon dioxide and carbon dioxide dissolved in mix water is used.

In certain embodiments, the invention provides a method for accelerating the early strength development of an SCM-concrete mix, thus accelerating aspects of a job in which the SCM-concrete mix is used that require a certain strength before a next step may be taken (such as removing molds, adding a level of concrete, and the like), by exposing the SCM-concrete mix to a dose of carbon dioxide sufficient to modulate, e.g., accelerate, early strength development of the mix to a level at which the aspect of the job may be accelerated. The dose of carbon dioxide to the mix can be not more than 2.0, 1.5, 1.2, 1.0, 0.9, 0.8, 0.7, 0.6, 0.5, 0.4, 0.3, 0.2, 0.1, or 0.05% carbon dioxide bwc, and/or not less than 2.5, 2.0, 1.5, 1.2, 1.0, 0.9, 0.8, 0.7, 0.6, 0.5, 0.4, 0.3, 0.2, or 0.1% carbon dioxide bwc. The dose can be such that the early strength development of the mix, e.g., the strength at 8, 12, 16, 20, or 24 hours, or any other suitable time point for early strength development, is, on average, at least 1, 2, 5, 7, 10, 12, 15, 20, 25, 30, 35, or 40% greater than the strength without the carbon dioxide dose. The SCM can comprises at least 1, 2, 3, 4, 5, 6, 7, 8, 9, 10, 12, 15, 20, or 30% of the mix, and/or not less than 2, 3, 4, 5, 6, 7, 8, 9, 10, 12, 15, 20, 30, 40, or 50% of the mix. In certain embodiments, an alternative or additional marker than early strength development, such as a value from calorimetry as described elsewhere herein, may be used instead of or in addition to early strength measurements, for example, to determine the desired or optimal dose of carbon dioxide and/or dosing conditions. The carbon dioxide may be delivered as a single dose or multiple doses, and at any suitable rate or in any suitable form, as described elsewhere herein. The SCM can be any suitable SCM. In certain embodiments, the SCM is fly ash. In certain embodiments, the SCM is slag. In certain embodiments, the SCM-concrete mix is delivered to a job site in a ready mix truck, and the carbon dioxide is applied to the mix at the batching site, en route to the job site, or at the job site, or any combination thereof. In certain embodiments, the carbon dioxide is gaseous carbon dioxide. In certain embodiments, the carbon dioxide is dissolved in mix water. In certain embodiments, the carbon dioxide is solid carbon dioxide. In certain embodiments, a combination of gaseous carbon dioxide and carbon dioxide dissolved in mix water is used.

In a ready-mix operation, the carbon dioxide may be delivered to the drum of the truck via a conduit, or lance or wand, that is positioned relative to the drum of each truck as it passes through the delivery site, e.g., the batching site, a wash station, or other suitable carbon dioxide delivery site. The lance can attached to the orifice as described herein, for example, at a NPT connection as shown in FIG. 1, and used to direct the carbon dioxide, such as mixture of solid and gaseous carbon dioxide, to a desired location in the drum. The lance is positioned so that carbon dioxide is delivered to the concrete mix in the drum of the truck. When carbon dioxide delivery is complete, the lance is moved as necessary to allow the truck to leave the delivery site and a new truck to enter the delivery site, then positioned as necessary for the next carbon dioxide delivery to the new truck. In general, it is preferable that the lance or wand be constructed of insulating materials so as to preserve the carbon dioxide in solid form and minimize sublimation to gaseous carbon dioxide, which improves efficiency of delivery of the carbon dioxide to the concrete mix.

Figure 5:
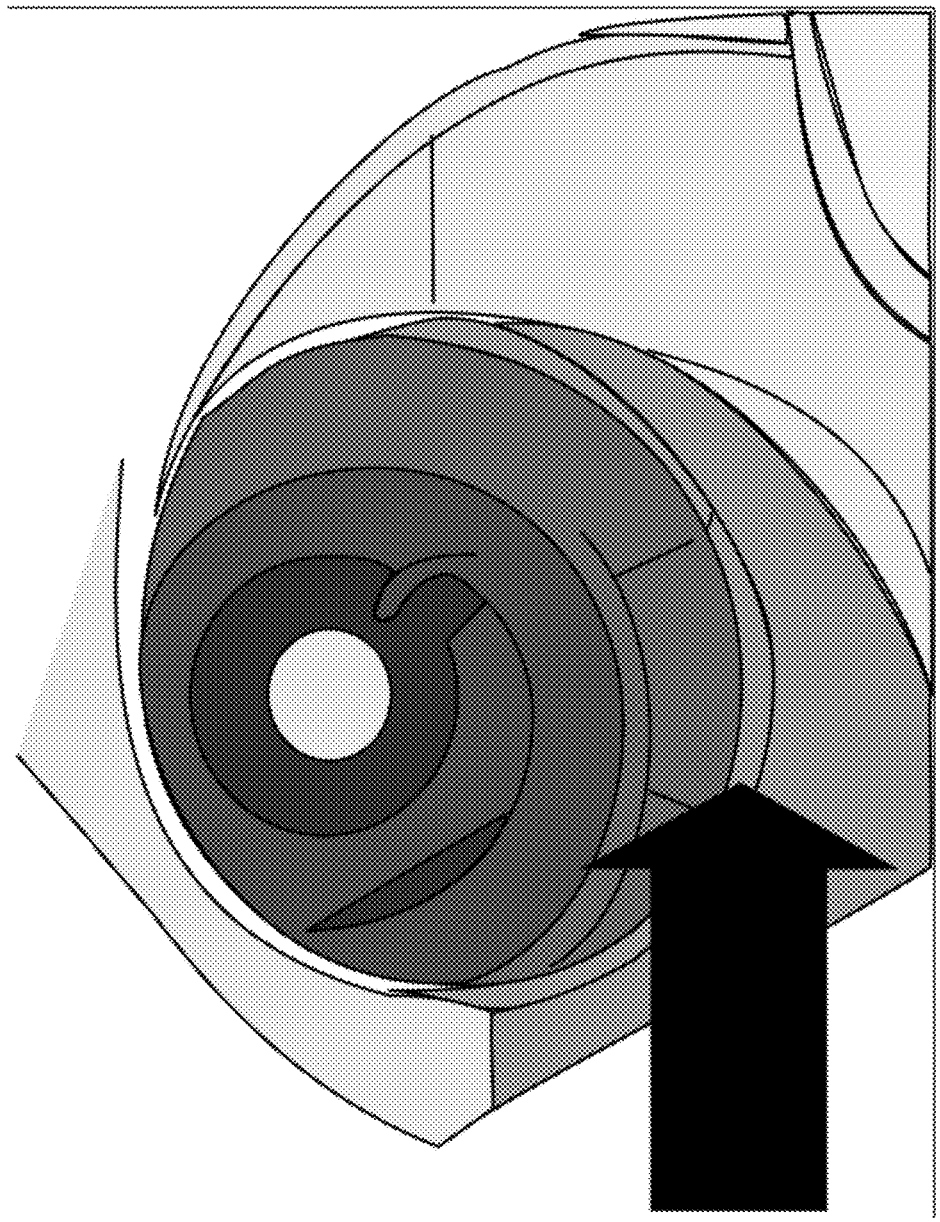
FIG. 5 shows one position at which the wand for carbon dioxide delivery can be aimed in the drum of a ready-mix truck, at the second fin in the truck on the bottom side of the drum.

When such a delivery system is used, the positioning of the conduit for the carbon dioxide so that the opening is in a certain position and attitude relative to the drum can be important; one aspect of some embodiments of the invention is positioning the wand, and/or an apparatus for doing so, to facilitate efficient mixing of the gaseous and/or solid carbon dioxide with the cement mix as the drum rotates. Any suitable positioning method and/or apparatus may be used to optimize the efficiency of uptake of carbon dioxide into the mixing cement as long as it positions the wand in a manner that provides efficient uptake of the carbon dioxide, for example, by positioning the wand so that the opening is directed to a point where a wave of concrete created by fins of a ready-mix drum folds over onto the mix; without being bound by theory it is thought that the wave folding over the fin immediately subsumes the carbon dioxide, e.g., solid carbon dioxide within the cement mix so that it releases gaseous carbon dioxide by sublimation into the mix rather than into the air, as it would do if on the surface of the mix. One exemplary positioning is shown in FIG. 5, where the wand is aimed at the second fin in the drum of the truck, on the bottom side of the fin. In a ready-mix truck carrying a full load, the opening of the wand may be very close to the surface of the mixing concrete, as described below, to facilitate the directional flow of the carbon dioxide mix into the proper area. Part or all of the wand may be made of flexible material so that if a fin or other part of the drum hits the wand it flexes then returns to its original position.

In certain embodiments, the invention provides a system for positioning a carbon dioxide delivery conduit on a ready-mix truck so that the opening of the conduit is directed to a certain position in the drum of the truck, for example, as described above. The conduit may deliver gaseous carbon dioxide or a mixture of gaseous and solid carbon dioxide through the opening. In the latter case, the conduit is constructed of materials that can withstand the liquid carbon dioxide carried by the conduit to the opening. The system can include a guide, which may be mounted on the truck, for example permanently mounted, that is configured to allow the reversible attachment and positioning of the conduit, for example, by providing a cylinder or holster into which the conduit can be inserted, so that the conduit is positioned at the desired angle for delivery of the carbon dioxide to a particular point, and a stop to ensure that the conduit is inserted so that the opening is at the desired distance from the concrete. This is merely exemplary and one of skill in the art will recognize that any number of reversible attachment and positioning devices may be used, so long as the angle and position of the opening relative to a desired point in the drum is obtained, e.g., clamps, etc. The wand is positioned in the guide, for example, manually by the driver of the ready-mix truck, or automatically by an automated system that senses the positions of the various components, or a combination thereof. When the wand is properly positioned, a signal is sent to a control system alerting the system that the wand is in position. The signal may be sent manually, e.g., by the driver of the truck after insertion of the wand, or by a batcher, or another operator, e.g., by pressing a button. Alternatively, a sensor may be tripped when the wand is positioned properly. Once the system controller is alerted that the wand is in position, carbon dioxide delivery can begin, either at that time or after a desired delay. The controller can be configured so that if the conduit is not positioned properly, e.g., the operator or sensor does not send the signal, the delivery will not start. The system may also be configured so that if one or more events occur during before, during, or after delivery, an alarm sounds and/or delivery is modulated, for example, stopped, or not initiated. For example, an alarm can sound if the wand loses signal from the positioning sensor during injection, or the pressure exceeds a certain threshold, e.g., the pressure is greater than 25 psi when both valves for delivery of gaseous and liquid carbon dioxide to the conduit is closed, e.g., when both are closed (which determines if a valve sticks open), or if the next truck in the queue has not been initiated in a certain amount of time. Exemplary logic for a controller can include:

If the wand loses signal during injection, an alarm light can come on and a message can pop on a HMI, for example, a screen, informing an operator that the injection wand is disconnected and to reconnect and press Start button to continue. There can also be an indicator, e.g., a button that indicates "Injection Complete" which would end that batch and record what was actually injected vs the target. In a batching facility in which a plurality of different trucks are being batched, a system controller may be configured to receive input regarding the identity of each truck at the carbon dioxide delivery site and select the appropriate action, e.g., delivery/no delivery, timing, flow, and amount of carbon dioxide delivered, and the like. For example, for entering a truck number that corresponds to the current truck being batched (signal being sent to plc), a dialog box can pop up when the system controller gets the signal from the customer PLC asking an operator to "Please input Identification Number" (e.g., a 1-10 digit number), alternatively, the truck identifier numbers can be in a predetermined order, e.g., sequential. To choose the option, there may be a selector switch on the maintenance screen. Feedback may also be provided to an operator, e.g., a batcher, showing relevant information for the batches run, such as Identification Number, Time Batched, Time Injected, Dose Required and Dose Injected, and the like. The units of the dose can be any suitable units, for example either lbs or kgs depending on the units selected. A "spreadsheet" can be provided that shows all batches from the current day (or makes the date selectable) so that the batcher can review it and scroll though, for example a printable spreadsheet.

Thus, for example, a carbon dioxide delivery system may be positioned at a ready-mix facility at a point where trucks stop for sufficient time for delivery of the desired dose of carbon dioxide to the drum of the truck, for example, at a wash rack. The carbon dioxide delivery system may be one that delivers a mixture of solid and gaseous carbon dioxide through an orifice, as described herein. The orifice may be operably connected to a conduit, such as a flexible conduit, that leads the carbon dioxide, e.g., a mixture of gaseous and solid carbon dioxide, to a wand that then delivers the carbon dioxide to the drum of the ready-mix truck. The flexible conduit is of sufficient length to allow for flow of carbon dioxide from the source of carbon dioxide to the wand when the wand is positioned at the desired position in the ready-mix truck, e.g., 5-30 feet in length, such as 10-25 feet in length, or any other suitable length according to the particular setup. The flexible conduit is generally constructed of insulating material, for example, a vacuum jacketed hose, that can withstand the temperatures of the mixture of gaseous and solid carbon dioxide. Any suitable diameter of hose may be used, for example, ¼-1 inch, or ¼-¾ inch, or about ½ inch diameter.

The flexible conduit can be operably connected to a wand, which, in general, is a rigid or semi-rigid conduit so that it can be reliably and reproducibly positioned to deliver the carbon dioxide to a desired location in a mixer, such as a drum of a ready-mix truck; in general the conduit will also include a handle that is insulated for ease of handling and for positioning the wand in a holder, e.g., a holster, on or near the drum of the ready-mix truck. The wand can be constructed of any suitable material or combination of materials, that is, e.g., material that can withstand the temperatures of the mixture of solid and gaseous carbon dioxide that pass through it. In certain embodiments, part or all of the wand comprises an inner aluminum tube and an outer rigid plastic tube; the aluminum tube may extend all of the way through the outer plastic tube or only part way. The outer pipe may be any suitable material, such as polyvinyl chloride (PVC) or acrylonitrile butadiene styrene (ABS). In certain embodiments, the aluminum tube extends only to the end of the handle, and the rest of the wand is plastic pipe. In certain embodiments, the wand is entirely constructed of the plastic pipe. These materials are merely exemplary and it will be appreciated that any material that imparts the necessary rigidity for directing the flow of carbon dioxide to the desired spot and the necessary robustness to withstand the temperatures and working conditions may be used. The length of the wand may be any suitable length that allows for ease of handling and for correct positioning; in certain embodiments the wand is 3-8 feet long, such as 3-7 feet long, or 3-6 feet long.

The wand preferably includes a handle or stop, which is of greater diameter than the rest of the wand and which is shaped to fit into a holder, e.g., a holster, that is attached to or near the drum of the ready-mix truck, e.g., at the hopper. The holder, e.g., holster, is attached to or near the drum of the ready-mix truck in such a position that the wand may be inserted into or attached to it, e.g., by the truck operator, and, once inserted, reliably and reproducibly directs carbon dioxide to the desired location in the drum of the truck. In general, the location is chosen to deliver carbon dioxide to a spot in a full truck that will cause the carbon dioxide to be subsumed into the mixing concrete in an efficient manner, as described herein. The handle or stop can be configured so as to lock the wand into place once inserted. As described elsewhere herein, the assembly may include a sensor, e.g., on the locking mechanism, to alert a controller system that the wand has been properly positioned; alternatively, an operator may manually alert the system that the wand is properly positioned, e.g., by pressing a button. The wand may also include, at the distal end, a flexible portion so that it can be contacted by the concrete truck fins or concrete without damage. In addition, the wand may be scored, e.g., at the point where the wand leaves the hopper and enters the truck so that if it gets caught and enough force is exerted upon it, it will break away without damaging the upper part of the wand. The wand may also have a hose breakaway in case the truck drives away without removing the wand. This breakaway can also sever a sensor wire, if included, telling the system that the wand is no longer locked in place and thus stopping flow if it has not already been stopped.

FIG. 6 shows one example of a wand and holder.

Certain embodiments of the invention provide a positioning system for positioning a carbon dioxide delivery conduit in a drum of a ready-mix truck, wherein the positioning system is attached to the ready-mix truck, for example, at or near the drum of the ready-mix truck, and includes a holder into which the conduit can be positioned so that the opening of the conduit is in a desired location for delivery of carbon dioxide to the concrete of the ready-mix truck. The holder is attached to the truck, e.g., by welding or bolting or other suitable attachment method to provide a reliable attachment to the truck. The system may include a reversible locking mechanism for locking the conduit in place once it is inserted. The system thus may be, e.g., a holster as described herein, and include a reversible locking mechanism for locking the conduit in place once it is inserted. Thus, in an operation that includes a plurality of ready-mix trucks, for any truck for which carbon dioxide delivery is desired, a positioning system is affixed to the truck in a suitable location; each truck has its own positioning system that travels with the truck and is used, in combination with the wand and the carbon dioxide delivery and control system, when carbon dioxide delivery to a load of concrete is desired.

In embodiments in which carbon dioxide is contacted with the surface of the cement mix, e.g., hydraulic cement mix such as concrete, such as mixing concrete in a drum of a ready-mix truck, the flow of carbon dioxide may be directed from an opening or plurality of openings (e.g., conduit opening) that is at least 5, 10, 20, 30, 40, 50, 60, 70, 80, 90, or 100 cm from the surface of the cement mix, e.g., hydraulic cement mix during carbon dioxide flow, on average, given that the surface of the mix will move with mixing, and/or not more than 10, 20, 30, 40, 50, 60, 70, 80, 90, 100, 120, 140, 170, or 200 cm from the surface of the cement mix, e.g., hydraulic cement mix during carbon dioxide flow, on average. In certain embodiments, the opening is 5-100 cm from the surface, on average, such as 5-60 cm, for example 5-40 cm. In certain embodiments, the opening is 10-100 cm from the surface, on average, such as 10-60 cm, for example 10-40 cm. When the mixer is a drum of a ready-mix truck, these distances are generally calculated for a full load in the drum.

Thus, certain embodiments of the invention provide apparatus and methods for delivering carbon dioxide, e.g., a mixture of gaseous and solid carbon dioxide, to a concrete mix in a ready-mix truck at a distance of 5-100 cm from the surface, on average, such as 5-60 cm, for example 5-40 cm, or 10-100 cm from the surface, on average, such as 10-60 cm, for example 10-40 cm, from the surface of the mixing concrete. The dose of carbon dioxide delivered to the concrete may be any suitable dose, as described herein, The carbon dioxide may be delivered for any suitable length of time to reach the desired dose, for example, for 10-360 seconds, or 20-360 seconds, or 30-360 seconds, or 45-360 seconds, or 60-360 seconds, or 10-300 seconds, or 20-300 seconds, or 30-300 seconds, or 45-300 seconds, or 60-300 seconds, or 10-240 seconds, or 20-240 seconds, or 30-240 seconds, or 45-240 seconds, or 60-240 seconds.

In any of these systems, e.g., a delivery system that includes a rigid or semi-rigid wand that is inserted into a fixed holder attached on or near the drum of the ready-mix truck, flow of carbon dioxide may be measured and controlled as described herein; thus, the systems may include a flow sensing apparatus that determines the appropriate temperatures and pressures, and a controller that determines flow rate and time and determines total amount of carbon dioxide delivered to the drum of the truck, where the controller automatically stops the flow or signals to an operator who manually stops flow at the appropriate time, e.g., when a dose of carbon dioxide as described herein has been reached for the load of concrete in the truck.

Additional or alternative control systems and methods, such as those described in U.S. Patent Publication No. 20140373755, or PCT Publication No. WO2014205577, may be used. In certain embodiments, a control system or method includes feedback mechanisms where one or more characteristics of the concrete mix, and/or mixing apparatus and/or its environment is monitored by one or more sensors, which transmit the information to a controller which determines whether one or more parameters of the mix operation requires modulation and, if so, sends the appropriate output to one or more actuators to carry out the required modulation. The controller may learn from the conditions of one batch to adjust programming for subsequent batches of similar or the same mix characteristics to optimize efficiency and desired characteristics of the mix. Sensors may include one or more temperature sensors, carbon dioxide sensors, rheology sensors, weight sensors (e.g., for monitoring the exact weight of cement used in a particular batch), moisture sensors, other gas sensors such as oxygen sensors, pH sensors, and other sensors for monitoring one or more characteristics of a gas mixture in contact with the concrete mix, a component of the concrete mixing apparatus, a component exposed to the concrete mix, or some other aspect of the mix operation. Sensors also include sensors that monitor a component of the concrete mix apparatus, such as sensors that detect when mixing has begun, when components of a concrete mix have been added to a mixer, mass flow sensors, flow rate or pressure meter in the conduit, or other suitable sensors. Sensors, controllers, and actuators for control systems and methods are described in greater detail in U.S. Patent Publication No. 20140373755, or PCT Publication No. WO2014205577, and any such system and/or method may be used in embodiments of the present invention. See, e.g., paragraphs 106-156 and FIGS. 1-3 of U.S. Patent Publication No. 20140373755.

Certain embodiments of the invention provide one or more of an orifice as described, a conduit operably connected to the orifice to direct the carbon dioxide exiting the orifice, and, in some embodiments, a system for positioning the conduit so as to direct the carbon dioxide to a particular location, for example, a particular location in a drum of a ready-mix truck; the conduit apparatus may be affixed to the drum in a permanent or, preferably, temporary configuration. Certain embodiments of the invention provide for the positioning system itself, alone or affixed to a mixer, e.g., a ready-mix truck, or a plurality of positioning systems, each affixed to a separate mixer, e.g., to separate ready-mix trucks. Thus, for example, in a ready-mix operation, each truck that is designated as a potential receiver of carbon dioxide may have its own positioning system, e.g., a holster, affixed thereto in such a location as to position the conduit to deliver carbon dioxide to a desired location inside the drum of the truck while concrete is mixing in the drum, so that the conduit may be temporarily attached to different ready-mix trucks as desired to deliver carbon dioxide to the different trucks. Hence, in certain embodiments, the invention provides systems and methods for delivery of carbon dioxide to the drums of one or more ready-mix trucks where each truck to which carbon dioxide is to be delivered has affixed thereto a positioning system that travels with the truck, and a carbon dioxide delivery systems, for example as described herein, that includes a conduit for delivery of carbon dioxide from a source of carbon dioxide to the ready-mix truck, where each positioning system is affixed in a location and position such that the conduit may be temporarily attached to the truck and positioned in such a way as to allow carbon dioxide to be delivered to a desired location within the drum of the truck, for example, while concrete is mixing in the drum of the truck. Locations and positioning may be as described herein. The system may include at least 1, 2, 3, 4, 5, 6, 7, 8, 9, 10, 12, 15, 20, 25, 30, 40, or 50 separate ready-mix trucks, each with its own positioning system attached, and 1 or, in some cases, more than 1, such as 2, 3, 4, 5, or more than 5 carbon dioxide delivery systems that include a conduit that may be temporarily attached to the trucks for delivery of carbon dioxide from a source of carbon dioxide to the drum of the truck. The carbon dioxide delivery system may be positioned, when in use, at a location where the truck or trucks normally halt for a period sufficient to deliver a desired dose of carbon dioxide to the concrete in the truck, for example, at a location where the trucks normally halt for at least 1, 2, 3, 4, 5, 6, 7, 8, 9, or 10 minutes. For example, the delivery system may be positioned at a wash rack in a batching facility. In this way, carbon dioxide can be delivered to the trucks without significantly altering the time the trucks remain in the batching facility, as it is delivered during an operation that would normally take place, e.g., washing the trucks, and the only potential additional time would be in the attachment and detachment of the conduit, and in some cases the starting and stopping of delivery of the carbon dioxide, if done by the truck driver. Thus, the system and methods may allow delivery of a desired dose of carbon dioxide to the ready-mix trucks, such as a dose of 0.05-2% bwc, or any other dose as described herein, without prolonging the average time that a truck remains in the batching facility by more than 1, 2, 3, 4, 5, 6, 7, 8, 9, or 10 minutes, for example, by no more than 2 minutes, or no more than 4 minutes, or no more than 6 minutes, on average. The carbon dioxide delivery system may be a liquid delivery system and further include an orifice that allows liquid carbon dioxide, or a mixture of liquid and gaseous carbon dioxide, under pressure, to be converted to solid and gaseous carbon dioxide as it passes through the orifice to an area of lower pressure, for example, to an area of atmospheric pressure, as described herein. Systems and methods for monitoring the flow of carbon dioxide, such as those described herein, may be included in the systems and methods of delivering carbon dioxide to the drums of ready-mix trucks. Systems and methods for controlling the flow of carbon dioxide, such as those described herein, such as starting, stopping, and/or otherwise modulating the flow, may be included in the systems and methods of delivering carbon dioxide to the drums of ready-mix trucks.

In an alternative embodiment, each truck has an attached conduit, e.g., a hose or pipe onboard for carbon dioxide delivery to its drum. This can be, e.g., a line that mirrors the water input line on the truck from just above the water tank into the back of the truck. A flexible hose is connected to this line when carbonated concrete is required, for example, as indicated by a light that illuminates next to the hose in the batch house; the orifice and other parts of the apparatus are, e.g., proximal to the flexible hose. Once it is connected, a signal, such as from a sensor or a button press by the operator, indicates to the first controller that the hose is connected and the system can deliver carbon dioxide into the truck during the batching process. Once the delivery is complete, the line is disconnected and the operator can drive away. There can also be a safety to ensure the operator doesn't drive away with the line attached.

The systems and methods lend themselves to retrofitting of existing operations, for example, retrofitting an existing ready-mix operation so as to allow delivery of solid and gaseous carbon dioxide to a desired location in separate ready-mix trucks.

EXAMPLES

Example 1

In this Example, the accuracy of the methods of flow determination was verified by comparing total amount of carbon dioxide delivered as measured by change of weight to total amount of carbon dioxide delivered as determined using the methods of the invention.

A system to deliver carbon dioxide to an orifice using carbon dioxide gas and carbon dioxide liquid was constructed, and carbon dioxide exited the orifice as a mixture of solid and gaseous carbon dioxide, as described herein. Upstream temperature and pressure were measured, and downstream temperature, and flow rates and total amount of carbon dioxide delivered through the orifice were calculated as described herein. The carbon dioxide was supplied from pressurized portable liquid carbon dioxide tank (such as a Dewar), and the weight of the pressurized portable liquid carbon dioxide tank (such as a Dewar) supplying liquid carbon dioxide was measured before and after dosing (because liquid carbon dioxide contributes far more than gaseous carbon dioxide to the total carbon dioxide delivered, the change in weight of the gaseous source was not measured), so that total amount of carbon dioxide delivered could be determined from total overall weight change. The calculated and measured total delivered amounts of carbon dioxide were compared and the calculated values were found to vary no more than 10% from the measured values.

This Example demonstrates that the apparatus and methods of the invention provide an accurate assessment of carbon dioxide flow and delivery.

Example 2

An example of ready-mix injection system and wand is as follows:

System calculates $CO_2$ flow using the equations described herein.

Input comes from the customer in the form of a continuous signal (similar to that used in "admixture combined system"). System assumes a maximum flow rate and sends back signals for every X kg and system also counts these pulses so that it knows what the dose is for a particular truck. This dose would be stored until the start button is pressed or the system is otherwise activated, at which carbon dioxide delivery starts. The system can delete the dose if the start button isn't pressed within the system timeout. 3-4 doses, or more, can be able to be stored and they would be injected in sequential order (ie. if there are 3 doses, dose 1 would start upon the first press of the start button, then wait for it to be pressed again for dose 2, which would be another truck and so forth). After the dose is received and the dose is known, the dose (in kg or lb) and the time batching started can be displayed in a list on an operations screen. The top entry can be the next to get injected at the rack and any others would fall below it, in order. There can be an erase button that erases the selected dose from the list as well as a swap button (or something similar) so that if a truck gets out of order, a batcher could "swap" the doses so that each truck gets the intended dose.

A human machine interface (HMI) can contain one recipe that can have a max flow rate setting, pause duration, max time for pause injection, system ID number, max $CO_2$ dose possible (kg or lbs, depending on location), system timeout, gas purge time (sec), pulse duration (ms), X kg/pulse (kg), and Ghost flow rate (slpm) and initiation time (sec).

Max flow rate (slpm)—max flow of system, if it is reached, system opens and closes valves to maintain that rate Pause duration (sec)—duration of injection pause while system is injecting. If this is "0", then system injects at max flow until the desired quantity is achieved. If a value is here, the system calculates the injection as follows. It determines the time the quantity would take at max flow, find the difference that time and "max time for pause injection", then divide that time by the pause duration to determine the number of pauses and equally distribute them during the injection. (ie. the system would inject at full flow for a time, then pause, then inject, then pause etc. until the injection is complete)

Max time for pause duration (sec)—maximum injection time while the pause injection method is being used System ID number—An ID number to identify the system when looking at data Max CO2 dose possible—Largest dose possible, if a higher dose is received, the system will inject the max System timeout (sec)—Time before system removes the truck from the injection list if it hasn't been dosed Gas purge time (sec)—Time for gas to purge output line/wand after the desired quantity has been reached Pulse duration (ms)—Length that 24VDC pulse is output X kg/pulse (kg)—Send pulse after each X kg of $CO_2$ is injected Ghost flow rate (slpm)—Flow rate the system uses to send feed back (system will assume this flow immediately upon receiving signal 120VAC from customer (can use a relay to get 24VDC for PLC)

Initiation time (sec)—Length of time systems waits from when truck is batched until it actually starts injecting even if start button is pressed before that time, however, the light showing injection will illuminate once the button is pressed and continue until injection is complete System starts injecting when both the sensor is tripped in the locking mechanism and the start button is pressed. When system is locked, orange light illuminates, when system is injecting green light illuminates, and goes off once complete. When complete, a blue light illuminates and if a critical alarm occurs, a red light comes on. Other colors may be used as desired and appropriate. A buzzer shortly sounds when the wand is first locked in place.

System also records data via HMI. The system records the $CO_2$ dose required, $CO_2$ dose received, plant number and time of day (both batched and injected) for "Customer Data" for each injection. All other data, such as flow rates, sensor data, etc. can be recorded for engineering purposes. This data can be transferred to a central Main computer via a cellular or hardwired router. This would also allow system access to change software in PLC and HMI.

System Components:
PLC
HMI
Liquid valve
Gas valve
2 ball valves
2 PRV's
2 Pressure gauges
Orifice assembly
Temperature Probe
Pressure Sensor
Temperature Sensor for orifice
Vacuum jacketed hose from box to wand
Sensor for proper connection of wand
Red, Green, Blue and Orange lights
Buzzer
Start button While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An apparatus for determining a flow rate of carbon dioxide, comprising:
   (i) a delivery line through which flows gaseous carbon dioxide, liquid carbon dioxide, or a combination of gaseous and liquid carbon dioxide, wherein the delivery line is operably connected to a source of liquid carbon dioxide and/or a source of gaseous carbon dioxide;
   (ii) an orifice at the distal end of the delivery line, through which the carbon dioxide exits from the delivery line, wherein the diameter of the delivery line as it joins the orifice is $D_p$ and the diameter of the orifice is $D_o$, and wherein $D_o$ is less than $D_p$;
   (iii) a first temperature sensor proximal to the orifice and configured to detect a first temperature, T, of carbon dioxide in the delivery line and to transmit the detected first temperature to a flow rate calculation system;
   (iv) a pressure sensor proximal to the orifice and configured to detect a pressure, $P_u$, of carbon dioxide in the delivery line and to transmit the detected pressure to the flow rate calculation system; and
   (v) a second temperature sensor distal to the orifice and configured to detect a second temperature, $T_D$, of carbon dioxide exiting the orifice and to transmit the detected second temperature to the flow rate calculation system.

2. The apparatus of claim 1 further comprising:
   (vi) the flow rate calculation system.

3. The apparatus of claim 2, wherein the flow rate calculation system is configured to (a) at a first time, determine from $T_D$ whether the carbon dioxide in the delivery line when it reaches the orifice is 100% gas or 100% liquid, or a mix of gas and liquid, and
   (b) calculate an instantaneous flow rate for the first time, wherein when the carbon dioxide in the delivery line as it is delivered to the orifice is 100% gas or 100% liquid, the flow rate is calculated from $D_p$, $D_o$, and $P_u$, and T for the first time; and when the carbon dioxide in the delivery line as it is delivered to the orifice is a mixture of gas and liquid, the flow rate is calculated from $D_o$, $P_u$, T, and $T_D$ at the first time.

4. The apparatus of claim 2 comprising a mixer for mixing concrete.

5. The apparatus of claim 4 wherein the mixer is a transportable mixer.

6. The apparatus of claim 5 wherein the transportable mixer comprises the drum of a ready-mix truck.

7. The apparatus of claim 1 further comprising a mixer for mixing concrete or a container containing a material used in concrete, wherein the apparatus is configured to deliver carbon dioxide to the mixer or the container.

8. The apparatus of claim 1 further comprising a conduit operably connected to the distal end of the orifice and configured to direct the carbon dioxide to a destination, wherein the conduit is constructed of materials that can withstand the temperatures of gaseous and solid carbon dioxide.

9. The apparatus of claim 8 wherein at least part of the conduit is flexible.

10. The apparatus of claim 9 wherein the distal end of the conduit is flexible.

11. The apparatus of claim 8 wherein the conduit is operably attached to a guide that allows reversible attachment and positioning of the conduit to a drum of a ready-mix truck in order to deliver carbon dioxide into the drum of the ready-mix truck.

12. The apparatus of claim 8 wherein the conduit is attached to a ready-mix truck.

13. The apparatus of claim 8 wherein the conduit is not attached to a ready-mix truck.

14. The apparatus of claim 1 wherein the flow rate calculation system is configured to calculate the flow rate of carbon dioxide at a plurality of times or time intervals, each of which has its own $P_u$, T, and $T_D$, which may be the same or different than the $P_u$, T, and/or $T_D$ of the other times.

15. The apparatus of claim 14 wherein the time interval is 100 ms or less.

16. The apparatus of claim 14 wherein the time interval is 20 ms or less.

17. The apparatus of claim 14 wherein the plurality of times is at least 100 times.

18. The apparatus of claim 14 wherein the plurality of times is at least 1000 times.

19. The apparatus of claim 14 wherein the flow calculation system is configured to calculate a total amount of carbon dioxide that has flowed through the orifice based on the instantaneous flow rates for the plurality of times or time intervals.

20. The apparatus of claim 19 wherein the flow rate calculation system outputs the total amount of carbon dioxide to a system controller.

21. The apparatus of claim 20 wherein the system controller compares the total amount of carbon dioxide to a predetermined end amount of carbon dioxide, and when the total amount is equal to or greater than the predetermined end amount, sends a signal to one or more actuators configured to modulate the flow of carbon dioxide through the orifice to cause the one or more actuators to modulate the flow of carbon dioxide.

22. The apparatus of claim 21 wherein the modulation is a cessation of the flow of carbon dioxide.

23. The apparatus of claim 1 wherein the source of gaseous carbon dioxide and the source of liquid carbon dioxide are the same.

24. The apparatus of claim 1 wherein the source of gaseous carbon dioxide and the source of liquid carbon dioxide are different.

25. An apparatus for delivering carbon dioxide to the drum of a ready-mix truck comprising
   (i) a source of liquid carbon dioxide;
   (ii) a first conduit for conducting the liquid carbon dioxide to an orifice, wherein the first conduit is operably connected to the source of liquid carbon dioxide, is flexible and is constructed of materials capable of withstanding the temperature of the liquid carbon dioxide, and wherein the distal portion of the conduit has a diameter $D_p$ and the orifice has a diameter $D_o$, where $D_o$ is less than $D_p$;
   (iii) a second conduit, operably connected to the orifice and configured to conduct solid and gaseous carbon dioxide released from the orifice into the drum of the ready-mix truck, wherein at least a distal portion of the second conduit is flexible; and (iv) a positioning component attached to the drum of the ready-mix truck into which the second conduit may be inserted in order to position the opening of the second conduit to deliver carbon dioxide to the drum of the ready-mix truck.

26. The apparatus of claim 25 further comprising a first temperature sensor positioned distal to the orifice to detect a temperature of the solid and gaseous carbon dioxide released from the orifice.

27. The apparatus of claim 25 further comprising a second temperature sensor positioned in the distal portion of the first conduit, proximal to the orifice to detect a temperature of the carbon dioxide proximal to the orifice.

28. The apparatus of claim 25 further comprising a pressure sensor positioned in the distal portion of the first conduit, proximal to the orifice to detect a pressure of the carbon dioxide proximal to the orifice.

* * * * *